(12) United States Patent
Lingle, Jr. et al.

(10) Patent No.: US 9,116,279 B2
(45) Date of Patent: *Aug. 25, 2015

(54) OPTIMIZED ULTRA LARGE AREA OPTICAL FIBERS

(71) Applicant: OFS Fitel, LLC, Norcross, GA (US)

(72) Inventors: Robert L Lingle, Jr., Johns Creek, GA (US); David W Peckham, Lawrenceville, GA (US)

(73) Assignee: OFS FITEL, LLC

( * ) Notice: Subject to any disclaimer, the term of this patent is extended or adjusted under 35 U.S.C. 154(b) by 0 days.

This patent is subject to a terminal disclaimer.

(21) Appl. No.: 14/188,357

(22) Filed: Feb. 24, 2014

(65) Prior Publication Data

US 2014/0169748 A1    Jun. 19, 2014

Related U.S. Application Data

(63) Continuation of application No. PCT/US2012/050555, filed on Aug. 13, 2012.

(51) Int. Cl.
| | |
|---|---|
| *G02B 6/036* | (2006.01) |
| *C03B 37/023* | (2006.01) |
| *G02B 6/02* | (2006.01) |

(52) U.S. Cl.
CPC ........ *G02B 6/02019* (2013.01); *G02B 6/02009* (2013.01); *G02B 6/03683* (2013.01); *G02B 6/03616* (2013.01)

(58) Field of Classification Search
CPC ............. G02B 6/0365; G02B 6/02019; G02B 6/03644; G02B 6/03627; G02B 6/03688; G02B 6/03683; G02B 6/02014; G02B 6/03633; G02B 6/03661; G02B 6/036; G02B 6/03672; G02B 6/03677; G02B 6/03622; G02B 6/03638; G02B 6/03616; G02B 6/03655
USPC .................... 385/127, 126, 123; 65/385, 415
See application file for complete search history.

(56) References Cited

U.S. PATENT DOCUMENTS

| | | | |
|---|---|---|---|
| 8,687,932 B2 * | 4/2014 | Peckham et al. | 385/127 |
| 8,718,431 B2 * | 5/2014 | Peckham et al. | 385/127 |
| 8,768,129 B2 * | 7/2014 | Peckham et al. | 385/124 |
| 2012/0275751 A1 * | 11/2012 | Krabshuis et al. | 385/126 |

* cited by examiner

*Primary Examiner* — Robert Tavlykaev
(74) *Attorney, Agent, or Firm* — Sam Han, Esq.

(57) ABSTRACT

Certain embodiments of the invention may include optimized trench-assisted ultra large area (ULA) optical fibers. According to an example embodiment of the invention, a trench-assisted optical fiber, optimized for microbend frontier (MBF) performance is provided. The optical fiber includes a core region having a longitudinal axis, a shelf region surrounding said core region, a cladding region surrounding said shelf region, said core and shelf and cladding regions configured to support and guide the propagation of signal light in a fundamental transverse mode in said core and shelf regions in the direction of said axis. The optical fiber further includes a core effective area (Aeff) of between 135 $\mu m^2$ and about 170 $\mu m^2$; a relative effective index difference (Neff) of greater than about 0.08%; a loss at 1550 nm of less than 0.180 dB/km; and a microbend frontier (MBF) distance of less than about 90%.

21 Claims, 13 Drawing Sheets

| Aeff (um2) | P. MB | MB Dist. (%) | FOM (dB) | FOM Dist. (dB) | Core Rad. (um) | Core Delta | Core Alpha | Core Vol | Shelf Width (um) | Trench In. Radius (um) | Trench Width (um) | Trench Delta | Trench Volume |
|---|---|---|---|---|---|---|---|---|---|---|---|---|---|
| 165.9 | 110.6 | 1.84 | 3.0 | 0.4 | 6.3 | 0.0021 | N/A | 7.23 | 5.3 | 11.61 | 5.53 | -0.0038 | -60.37 |
| 165 | 117 | 7.73 | 3.07 | 0.48 | 7 | 0.00182 | 21.6 | 8.18 | 5.78 | 12.78 | 5.78 | -0.0033 | -59.05 |
| 154.1 | 63.7 | 3.66 | 2.73 | 0.43 | 6.51 | 0.00165 | 9.6 | 5.79 | 4.56 | 11.08 | 5 | -0.003 | -40.73 |
| 150.4 | 48.6 | 0 | 2.82 | 0.19 | 6.63 | 0.00186 | 15 | 7.19 | 5.52 | 12.14 | 5 | -0.004 | -58.57 |
| 146.2 | 36.4 | 0 | 2.5 | 0.3 | 6.75 | 0.00219 | 21.26 | 9.12 | 7.47 | 14.22 | 4.71 | -0.004 | -62.39 |
| 142.4 | 41.1 | 26.07 | 2.34 | 0.53 | 6 | 0.00195 | 8 | 5.616 | 5.4 | 11.4 | 5.4 | -0.0042 | -63.96 |
| 141 | 30.9 | 2.72 | 2.24 | 0.48 | 6.05 | 0.00184 | 14.56 | 5.93 | 5.74 | 11.79 | 5 | -0.004 | -57.15 |
| 134.7 | 24.9 | 17 | 2.29 | 0.32 | 5.86 | 0.00187 | 8.25 | 5.17 | 5.93 | 11.79 | 5 | -0.0035 | -50.01 |
| 131 | 20.1 | 15.22 | 2.13 | 0.35 | 5.65 | 0.00186 | 14.62 | 5.22 | 5.25 | 10.9 | 5 | -0.004 | -53.6 |

FIG. 11

OPTIMIZED ULTRA LARGE AREA OPTICAL FIBERS

CROSS-REFERENCE TO RELATED APPLICATIONS

This application is a Continuation-In-Part of APPLICATION Serial No. PCT/US12/50555, which was filed on Aug. 13, 2012 and has the title "Optimized Ultra Large Area Optical Fibers."

FIELD OF THE INVENTION

This invention generally relates to optical fibers, and in particular, to optimized ultra large area optical fibers.

BACKGROUND OF THE INVENTION

Ultra large area (ULA) optical fibers are typically utilized in long distance transmission applications, for example, to reduce the number of required optical amplifiers at a fixed distance between a transmitter and a receiver and/or to increase the number of optical amplifiers supported at fixed amplifier spacing. By launching signals with increased optical power into the fiber, less optical amplification is required, and therefore less noise is added to the signal. However, non-linear effects, including self-phase modulation, cross-phase modulation, cross-polarization modulation, four-wave-mixing, etc. can increase as a function of transmitted optical power density. The large effective area of the ULA optical fibers can help reduce the non-linear effects by providing a lower power density for a given amount of transmitted optical power. However, bending losses, which can attenuate the signal, can increase with increasing effective area. Therefore, optical fibers have been designed with special core and cladding index profiles, and with materials that can help reduce microbending and macrobending losses.

A variety of optical fibers are made with a depressed-index ring or trench region outside of the core of the fiber and within the cladding of the fiber. Such fibers can improve transmission properties including chromatic dispersion and bending losses. The trench fiber design was originally disclosed by Reed in U.S. Pat. No. 4,852,968, filed on Apr. 2, 1987. In U.S. Patent Application Publication No. 2007/0003198 by Gibson, a trench-assisted fiber is disclosed for reducing losses by controlling the power distribution in the central core and the annular region between the central core and the trench. U.S. Pat. No. 7,164,835 discloses a trench-assisted design for reducing the macrobending sensitivity of fibers. European Patent No. EP1978383A1 discloses a trench-assisted design for ULA fibers with improved macrobending sensitivity compared to ULA fibers without a trench. In U.S. Pat. No. 7,555,187, fibers with very large effective area are disclosed with acceptable macrobend loss. Yamamoto (Y. Yamamoto, et. al., "OSNR-Enhancing Pure-Silica-Core Fiber with Large Effective Area and Low Attenuation," OFC 2010, paper OTuI2, March 2010) discloses a fiber with Aeff=134 $\mu m^2$ and 1550 nm loss=0.169 dB/km. This fiber is designed with a depressed cladding index profile and the microbending sensitivity that is greater than 100 times that of standard single mode fibers. Bigot-Astruc (M. Bigot-Astruc, et. al., "125 um glass diameter single mode fiber with Aeff of 155 $\mu m^2$," OFC 2011, paper OTuJ2, March 2011) discloses a trench assisted fiber with 155 $\mu m^2$ and a microbending sensitivity that is about 10 times that of standard single mode fibers but this fiber has 1550 nm attenuation that is 0.183 dB/km. Bickham (Bickham, "Ultimate Limits of Effective Area and Attenuation for High Data Rate Fibers," OFC 2011, paper OWA5, March 2011) disclosed trench assisted fibers with Aeff about 139 $\mu m^2$, but the microbending sensitivity is large and requires special low modulus coating materials to achieve low attenuation when the fiber is placed on the normal ship spools.

The prior art has provided a wealth of information on how to use the trench-assisted fiber design to make fibers with reduced losses or macrobending sensitivity, and to produce ULA fiber with an extremely large effective area. However, the prior art does not recognize or teach how to make trench-assisted ULA fiber that will provide optimum performance characteristics simultaneously across several key performance metrics.

BRIEF SUMMARY OF THE INVENTION

Some or all of the above needs may be addressed by certain embodiments of the invention. Certain embodiments of the invention may include optimized ultra large area optical fibers.

According to an example embodiment of the invention, a trench-assisted optical fiber, optimized for microbending performance, is provided. The optical fiber includes a core region having a longitudinal axis, a shelf region surrounding said core region, a cladding region surrounding said shelf region, said core and shelf and cladding regions configured to support and guide the propagation of signal light in a fundamental transverse mode in said core and shelf regions in the direction of said axis, the cladding region including an inner trench and an outer trench. The optical fiber further includes a core effective area (Aeff) of between 135 $\mu m^2$ and about 170 $\mu m^2$; a relative effective index difference (Neff) of greater than about 0.08%; a loss at 1550 nm of less than 0.180 dB/km; and a microbend frontier (MBF) distance of less than about 90%, wherein the microbend frontier (MBF) distance is defined as: B1·core delta+B2·(core radius)$^{-1}$+B3·core volume+ B4·trench delta+B5·(trench inner radius)$^{-1}$+B6·trench inner radius+B7·trench volume+B8·trench volume·trench inner radius, and wherein B1 is approximately 690; B2 is approximately −0.7; B3 is approximately −0.2; B4 is approximately 14; B5 is approximately 3; B6 is approximately 0.07; B7 is approximately 0.03; and B8 is approximately −0.0016.

Other embodiments and aspects of the invention are described in detail herein and are considered a part of the claimed invention. Other embodiments and aspects can be understood with reference to the following detailed description, accompanying figures, and claims.

BRIEF DESCRIPTION OF THE FIGURES

Reference will now be made to the accompanying charts and diagrams, which are not necessarily drawn to scale, and wherein:

FIG. 11 is a table of measured and calculated parameters for several manufactured fibers.

DETAILED DESCRIPTION OF THE INVENTION

Figure 1:
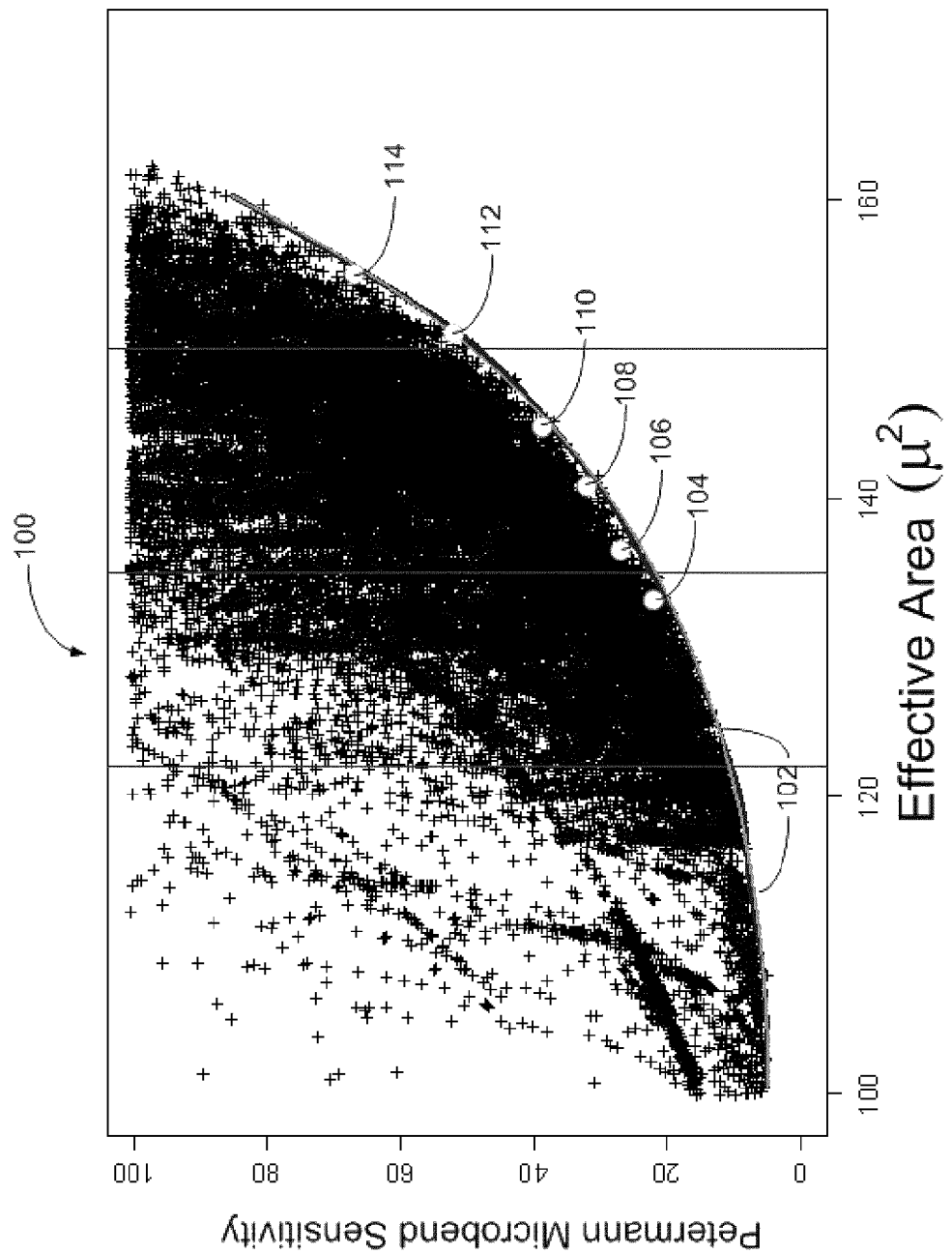
FIG. 1 is a chart of microbend sensitivity as a function of effective area for many example trench-assisted fiber designs.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Example embodiments of the invention provide parameters for ultra large area (ULA) optical fibers with performance characteristics that are optimized simultaneously across several key performance metrics. The focus of the prior art has been on reducing the macrobending sensitivity. However, maintaining acceptable performance levels of the ULA fiber is of very real practical concern. The concept of the "microbend frontier" is utilized herein to quantify how close to the optimum combination of effective area and microbending sensitivity that a particular design achieves.

Using concepts presented here, many trench-assisted fiber profiles were calculated and discovered that simultaneously give low microbending, low macrobending, acceptable cutoff, and maximize a performance figure-of-merit across a range of Aeff. Such calculations may only indirectly relate refractive index profile parameters to performance parameters.

In a first step, the calculations begin with index profile parameters for directly calculating electric fields and propagation constants of bound electromagnetic modes of the waveguide formed by the index profile. This is accomplished by solving the scalar Helmholtz equation to find eigenvalues and eigenvectors. As a second step, the performance metrics associated with the index profile are calculated from the electric fields and propagation constants by a series of additional calculations to find optical loss, Aeff, cutoff, macrobending, microbending, etc.

The example profiles identified in this disclosure are distinguished from the prior art. However, the trench profile designs have multiple parameters, which influence the properties and metrics in concert. It is thus insufficient to define the desirable profiles by the range of profile parameters independently of each other. A wide range of profile parameters specified independently captures both desirable and undesirable solutions.

Proposed is a method using transparent mathematical sums of terms comprising products of powers of index profile parameters that directly predict key performance metrics from profile parameters. This allows specifying those profiles that give the optimum solutions. The equations, according to example embodiments of the invention, capture the interaction between the profile parameters necessary to distinguish inventive solutions from both the prior art as well as undesirable solutions which may be similar to the inventive solutions.

One metric or property of trench-assisted ULA fiber is the microbending sensitivity. The microbending sensitivity of an optical fiber may be defined as a measure of the fiber's loss response when it is exposed to the typical stress that may occur in the cabled environment. A model proposed by K. Petermann provides a method for comparing the microbend performance of different optical fiber waveguides. [Theory of Microbending Loss in Monomode Fibres with Arbitrary Refractive Index Profile, *Archiv für Elektronik and Übertragungstechnik*, vol. 30, no. 9 (1976), pp. 337-342]. The Petermann model provides a method for estimating microbend sensitivity for a given index profile. According to example embodiments, the Petermann microbend sensitivity is normalized such that the value of 1 corresponds to the original AT&T depressed cladding optical fiber design with a depression to core ratio of 5.5:1. Standard single mode fiber made with a matched cladding index profile and that meets the ITU-T G.652.D specification typically has normalized Petermann microbend sensitivity of about 3.5.

FIG. 1 shows a chart 100 of Petermann microbend sensitivity versus the effective area for a large number of trench-assisted ultra large area (ULA) fiber designs with varying refractive index profiles. Solutions (represented by "+" symbols) from approximately 64,000 different fiber designs are plotted for fibers having an effective area ranging from about 100 um$^2$ to about 160 um$^2$. According to an example embodiment of the invention, FIG. 1 also depicts a microbend frontier (MBF) curve 102 that represents a minimum microbend sensitivity for a ULA fiber design and effective area, Aeff, within the family of ULA fiber designs considered. The effective area of the LP01 guided mode, Aeff, of a given fiber may be determined by its index profile. Example embodiments of the invention utilize the microbend frontier curve 102, in part, to quantify fiber designs that can result in fibers that have microbending sensitivity close to the MBF curve 102.

According to an example embodiment, the microbend frontier distance for a fiber design may be the normalized difference in the microbend sensitivity of that fiber design and the microbend sensitivity of the fiber design with the same effective area, but having the lowest possible microbend sensitivity. Therefore, according to example embodiments, the microbend frontier distance may be the vertical distance that a fiber lies above the microbend frontier curve 102.

The microbend frontier, for example as shown in FIG. 1, as the curve 102 may be determined as follows: the lowest value of Petermann microbend sensitivity (PMS) is found for each subset of fiber designs that have a 1 μm$^2$ effective area (Aeff) band, centered at an integer value of Aeff. This minimum value of PMS is found for integer values of Aeff's over the range of interest (for example, from 100 μm$^2$ to 155 μm$^2$, as shown in FIG. 1). The smallest Aeff band spans Aeff values from 99.5 to 100.5. In an example embodiment, a 4th order polynomial is fit to 61 points in the PMS-Aeff plane (minimum PMS at integer Aeff values over the desired range of Aeff), and this fit is defined as the microbend frontier curve 102 as shown in FIG. 1. Therefore, the microbend frontier curve 102 represents the smallest PMS value at every Aeff from 100 µm² to 155 µm² in this example. The microbend frontier curve may be calculated for other ranges of interest, for example, for an Aeff ranging from 80 µm² to 180 µm².

In accordance with example embodiments, the microbend frontier curve 102 may be utilized to determine a microbend frontier distance, which may be defined as a normalized (vertical) distance from the microbend frontier curve 102, and may be used as a metric to measure microbend sensitivity performance of a given design with respect to the optimum. For example, the microbend frontier distance for fibers having an effective area Aeff=A, and a Petermann microbend sensitivity for a given effective area=m(A) may be defined as: microbend frontier distance=(m(A) minimum {m(A)})/minimum {m(A)}.

According to example embodiments, FIG. 1 also depicts several example optical fibers 104, 106, 108, 110, 112, 114, represented by open circles, and for which the predicted loss is <0.185 dB/km, the effective index is >0.08%, the FOM frontier distance is less than 0.5 dB, and the microbend frontier distance is less than 25%. The example optical fibers 104, 106, 108, 110, 112, 114 are also plotted in FIG. 5 and FIG. 12, and represent the fiber designs listed in rows 1-3 and 5-7 (from the bottom) in the table 1100 in FIG. 11.

Figure 2:
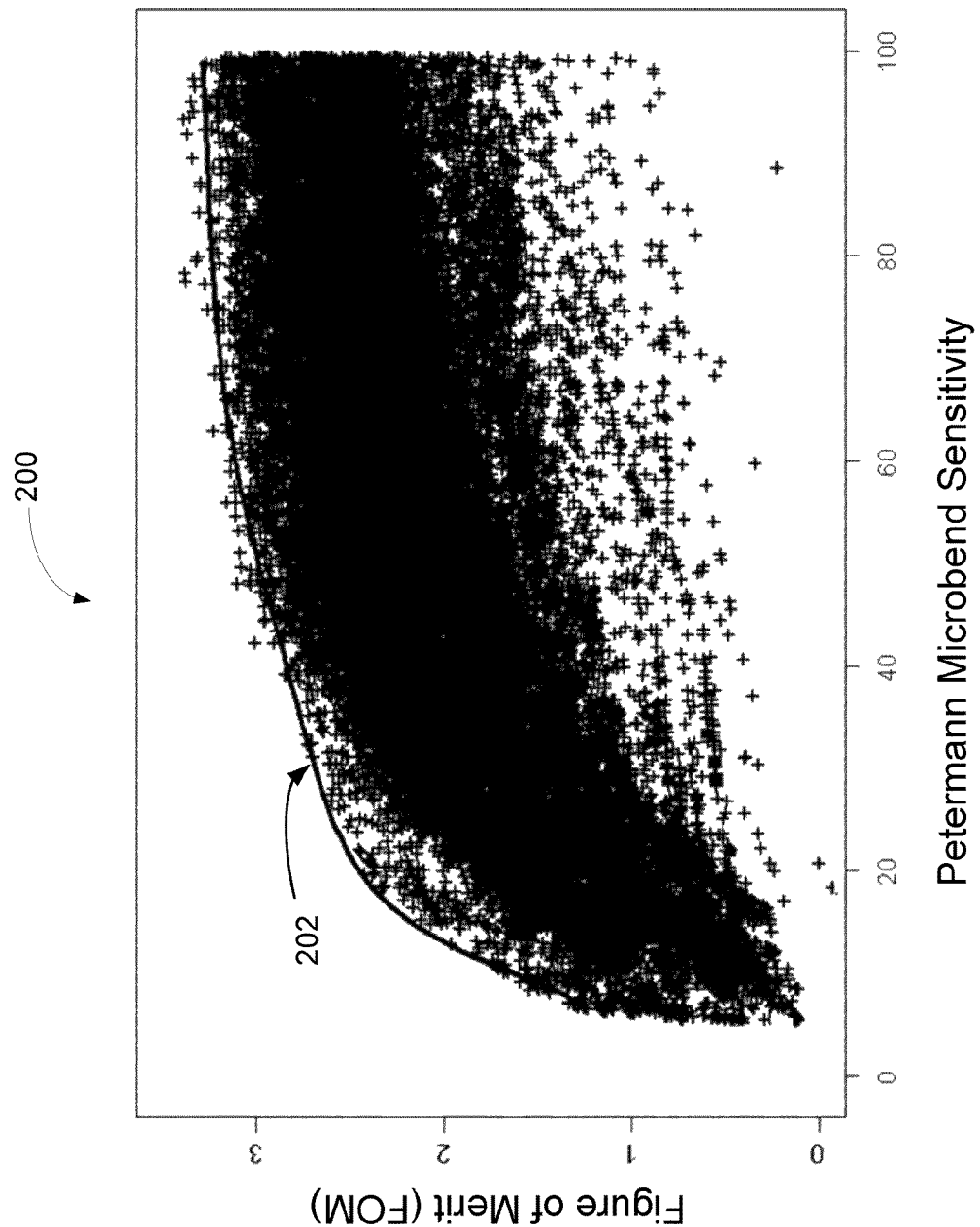
FIG. 2 is a chart of a figure of merit (FOM) versus the microbend sensitivity for many example trench-assisted fiber designs.

FIG. 2 shows a large number of ULA optical fiber designs 200 with a figure of merit (FOM) for optical signal-to-noise ratio (OSNR) in dB as a function of Petermann microbend sensitivity. According to an example embodiment, the FOM improvement in span OSNR is defined as: FOM=10 log 10 (Aeff/Aeff ref)+(fiber loss ref−fiber loss)*span length+10 log 10(n2 ref/n2), where Aeff ref is the effective area reference set at 106 um², the reference loss is set at 0.186 dB/km, the reference nonlinear refractive index, n2 ref, is set at 2.16×10^-20 m^2/W [Y. Namihira, "ITU-T Round Robin Measurement for Nonlinear Coefficient (n2/Aeff) of various Single Mode Optical Fibers] and the FOM is expressed in dB. The span length of 100 km was used since this value is desirable for many ultra-long haul transmission systems. However, the FOM could also be calculated using various values of span length when considering the fiber performance in different transmission systems. According to example embodiments, the fiber loss of a design is estimated using an empirical model that predicts the expected loss of the LP01 mode of a fiber design when fabricated with standard silica glass forming and fiber drawing practices. The model predicts the expected fiber loss by calculating the integrals, over the cross section of the fiber, of the product of the modal power and the germanium and/or fluorine dopant concentrations required to form the waveguide. The relationship between the dopant concentration and the expected loss is obtained from the published literature [M. Ohashi, et. al., "Optical Loss Property of Silica-Based Single-Mode Fibers," J. of Lightwave Tech., vol. 10, no 5, May 1992"]. These integrals have been calculated for many actual fibers with known dopant concentrations and measured attenuations. A loss prediction equation has been fitted to these empirical data, and it is used to estimate the loss expected of a given fiber design assuming that it is fabricated using standard practices. In a similar manner, the expected value of nonlinear refractive index for each fiber design is estimated using the power weighted integral of the dopant concentration and published empirical data [K. Nakajima, et. al., "Dopant Dependence of Effective Nonlinear Refractive Index in GeO2- and F-Doped Core Single-Mode Fibers," IEEE Photonics Tech. Letters, Vol. 14, No. 4, April 2002.] on the relationship between dopant concentration and n2. According to an example embodiment, the FOM frontier curve 202 may be defined as the maximum value of FOM for each value of Petermann microbend sensitivity.

According to example embodiments, the FOM frontier curve 202 may be determined in a similar fashion as is described above for the microbend frontier curve 102. For example, the maximum value of FOM may be found for all fiber designs that have Petermann microbend sensitivity (PMS) within each of a number of narrow bands of PMS values. In an example embodiment, these PMS bands are centered at the integer values of PMS from 5 to 99 with bandwidth of 1. For example, the lowest PMS band spans PMS values from 4.5 to 5.5. According to an example embodiment, a multi-term (for example 7-term) polynomial may be fit to these maximum value of FOM values, and the fit may be defined as the FOM frontier curve 202. The FOM frontier curve 202 represents the highest value of FOM, i.e, predicted improvement in system optical signal to noise ratio (OSNR), for every value of PMS from 5 to 99.

In accordance with example embodiments, a FOM frontier distance may be determined. The FOM frontier distance may be defined herein as a metric of the vertical distance any given fiber falls far below the FOM frontier curve 202. The FOM frontier distance may be expressed in units of dB, and the FOM frontier distance of fiber n is defined as:

FOM frontier at PMS of fiber n−FOM of fiber n.

In accordance with example embodiments, a multitude of fiber designs may be analyzed to determine microbend sensitivity and the figure of merit for each fiber design, as previously described. Frontier curves for both the microbend sensitivity and the figure of merit may be determined, and certain fiber designs may be selected based on the distance from the frontier curves and/or other factors. According to example embodiments, the designs for the selected fibers may provide advantageous performance characteristics over key performance metrics. The designs may be examined and quantified to provide guidelines for optimizing the fiber refractive index profiles to produce optical fibers with microbend sensitivity near the microbend sensitivity frontier, and a figure of merit near the figure of merit frontier.

Figure 3:
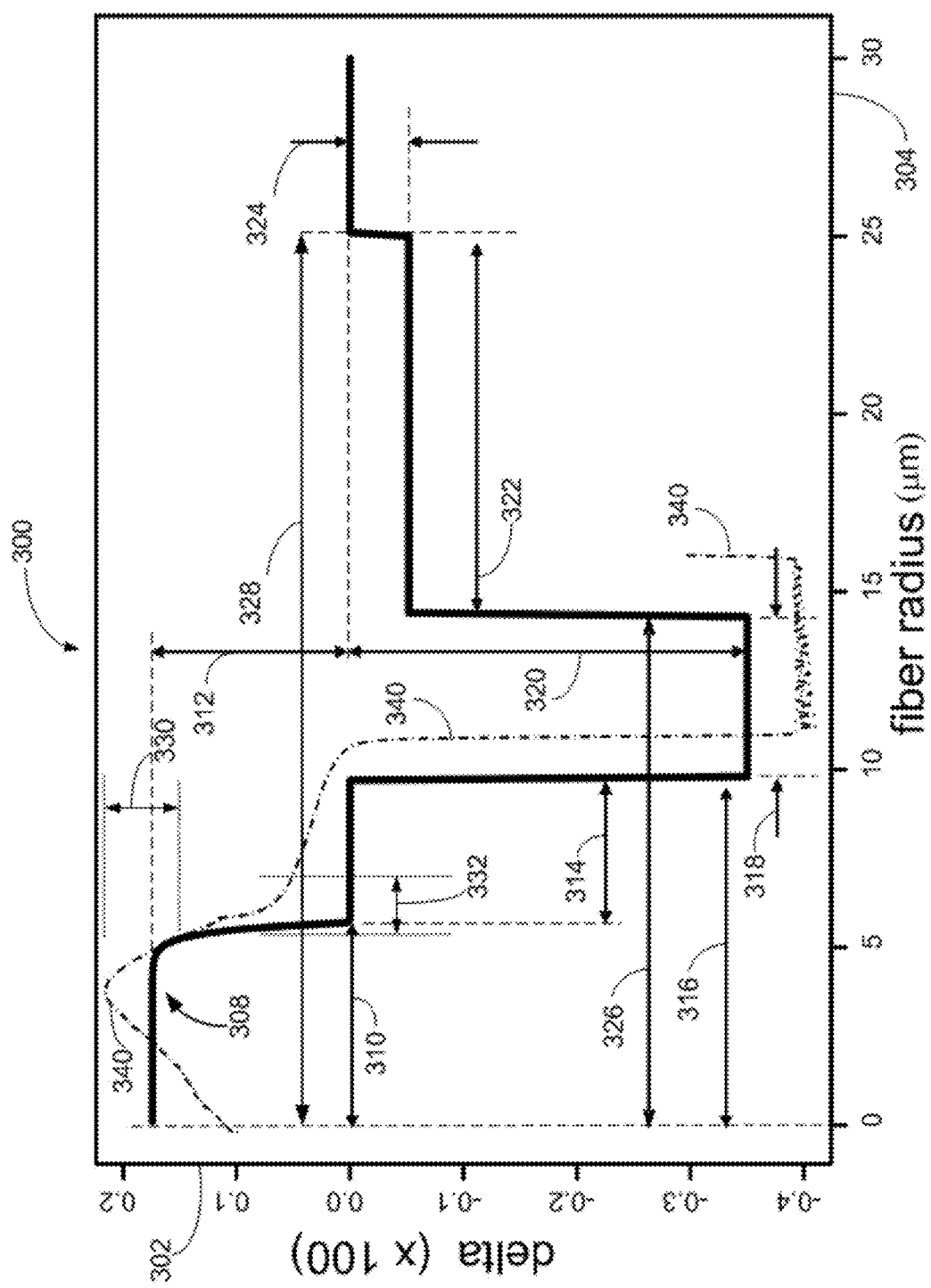
FIG. 3 is a diagram of an illustrative optical fiber refractive index profile as a function of the fiber radius, according to an example embodiment of the invention.

FIG. 3 depicts an example diagram of an illustrative optical fiber refractive index 302 profile, which varies as a function of the fiber radius 304, according to example embodiments. The index 302 profile can be expressed as a relative refractive index percentage, $\Delta(r)\% = 100(n(r)^2 - n_c^2)/2n(r)^2$, where n(r) is the refractive index in at radius r, and $n_c$ is the average refractive index of the outermost cladding area. In an example embodiment, the core delta 312 can be defined as the maximum delta in the core region, and the trench delta 320 can be defined as the average delta value within the trench region. The value of delta in the shelf region is shown as zero in FIG. 3, since, in one approximation, that would be the ideal value resulting in the lowest Rayleigh scattering for light traveling in that region of the profile. However, embodiments do not require that delta be zero in the shelf. Fibers with desirable combinations of Aeff from 135 µm² up to greater than 170 µm² coupled with low PMS and high FOM exist for delta in the shelf region between −0.05% and +0.05%.

According to example embodiments, the optical fiber may be designed to have a core with a particular shape 308 and radius 310, and the core may have a core refractive index delta 312. The core may have a core delta upper range 330 and a core radius upper range 332. One way to describe the shape of the core is to express the shape as a power law, with alpha as an exponent. For example, the core delta as a function of radial position can be expressed as:

$$\text{delta}(r) = \text{delta}(1-(r/a)^{alpha}),$$

where a is the core radius, delta is the normalized index difference at r=0, and alpha is the shape parameter. Example of shapes that result from certain settings of alpha include an ideal step index shape (alpha=infinity); parabolic shape (alpha=2), which is used often in multimode fiber; and a triangular shape (alpha=1), which was used in early dispersion shifted fibers.

In example embodiments, the core area may be defined as: $2*\int\Delta(r)\,r\,dr$ where the integral is evaluated from r=0 to r=a where a is the core radius and $\Delta(r)$ is expressed as a percentage. The core area, expressed in this way has units μm-%. The core may be surrounded by a shelf region with a shelf width 314 extending from the core to the trench inner radius 316. The trench may have a trench width 318 and a trench refractive index delta 320.

In one example embodiment, the refractive index of the outermost cladding region, $n_c$, is that of undoped silica or that of silica with less than 3000 ppm of chlorine (preferably between 1000 ppm and 3000 ppm) as is typical of synthetically manufactured material with low OH contamination. In this example embodiment the core delta 312 is obtained by fabricating the core region by doping with relatively low levels of either Ge or Cl or both. In this example embodiment the loss at 1550 nm is less than about 0.180 dB/km.

In another example embodiment, the refractive index of the outermost cladding region, $n_c$, is that of silica doped with less than 5 weight % of fluorine (preferably between 1 and 3 weight %). In this example embodiment the core delta 312 is obtained by fabricating the core region without Ge-doping (sometimes referred to as "pure silica"), although the region may include Cl-doping and or both Cl-doping and F-doping. Preferably, the Cl-doping is less than 20000 ppm and the F-doping is less than 10 weight %. In this example embodiment, the loss at 1550 nm is less than about 0.170 dB/km.

In an example embodiment, the trench may also be defined as having a trench volume defined as 100*(trench delta)*(trench width)*(2*trench inner radius+trench width). Surrounding the trench may be an outer trench with outer trench width 322 and an outer trench delta 324. According to an example embodiment, the outer trench may have a delta 324 in the range of about −0.12%+/−0.04%. The range of outer trench delta 324 that may be useful for improving the macrobend sensitivity at large bend diameters could be as shallow as about −0.04% to as deep as about −0.33%. In certain example embodiments, the outer trench delta 324 may be specified to less than about −0.12% to reduce costs associated with the preform. In the case of an idealized index profile, the transition between the shelf region and the trench region, and between the trench region and the outer trench, are considered as step functions. However, in fabricated fibers, the transitions are more gradual and, in this case, it is common for the boundary between the regions to be defined as the radius where the index has the value equal to the average of the indices associated with the two neighboring regions.

According to certain example embodiments, macrobending sensitivity (particularly at larger diameter bends) may be improved by increasing the outer trench width 322. However, the cutoff wavelength tends to increase with increased outer trench width 322. Therefore, design tradeoffs may be involved in setting the outer trench dimensions. The outer trench outer radius 328 is typically affected by practical/economic concerns, and most development prototypes have been made using tubes that result in an outer radius 328 of the outer trench region of about 25 μm. According to certain example embodiments, the outer trench region may be designed with an outer trench outer radius 328 as little as about 11 μm. According to other example embodiments, the outer trench region may be designed with an outer trench outer radius 328 as little as about 15 μm. In certain example embodiments, the outer trench region may be designed with an outer radius 328 up to about 24 μm. In other example embodiments, the outer trench region may be designed with an outer radius 328 up to about 35 μm, particularly for designs where improved macrobend sensitivity is needed. In certain example embodiments, the outer trench delta 324 may be designed within a range from about −0.33% to about 0.0%. In another example embodiment, the outer trench delta 324 may be designed in a preferred range from about −0.1% to about −0.05%. According to example embodiments, trench outer radius 326 may be designed within a range of about 11 μm to about 24 μm.

According to example embodiments, the outer trench width 322 may be defined as the difference between the outer trench outer radius 328 and the trench outer radius 326. According to certain example embodiments, the outer trench width 322 may range from about 0 μm to about 25 μm.

It should be noted that the profile region called the inner core in U.S. Patent Application Publication No. 2007/0003198 by Gibson is referred to simply as the core in this specification. The profile region called the outer core or second core region by Gibson is simply referred to as the shelf in this specification. Gibson's language recognizes that the positively-doped inner core and lightly or undoped outer core regions, when surrounded by a trench of sufficiently negative index, together play the role of the core in a traditional step-index fiber. Although this specification does not use the language of inner and outer core, example embodiments should be understood as utilizing the same concept using slightly different terminology.

The solid line of FIG. 3 represents a family of index profiles yielding fibers according to example embodiments, having a wide range of Aeff from 135 μm² up to greater than 160 μm², and having excellent microbending and FOM performance, when the profile parameters are chosen according to the teaching of this specification, using idealized profiles easily captured by standard mathematical descriptions well-known to those skilled in the art and commonly used to describe optical fiber profile designs. The idealized index profile shape illustrated by the solid line of FIG. 3 and the discrete set of parameters associated with the idealized profile, e.g., core radius, core delta, shelf width, trench delta, etc., are a convenient way to characterize the index profile of a given optical fiber design. The parameter set and the simple mathematical description of the index profile are often used as the inputs to simulations that predict the properties of the optical modes that propagate along the fiber. This parameterized description of the index profile is useful when studying the effect of varying the index profile shape on the transmission properties of the fiber, and for designing optical fiber to have certain advantageous characteristics. Profile shapes substantially similar to those could be realized by the plasma chemical vapor deposition (PCVD) or modified chemical vapor deposition (MCVD) methods. (A reduction in refractive index typically known as burnoff may occur near r=0.)

However it is also understood by those skilled in the art that some fiber fabrication methods produce deviations from the idealized shapes due to variations between torches and burners used to deposit soot, diffusion of dopants during dehydration and sintering of soot, etc. The dashed curve (340 in FIG. 3) shows an example of a realized embodiment of an optical fiber 340 using the vapor axial deposition (VAD) method to fabricate the core and shelf regions of the profile, mated to a trench formed by MCVD. The precise shape of the core is determined, by the temperature, velocity, and concentration profiles of each torch in which SiCl4 and GeCl4 are burned in O2 and H2 to yield SiO2 and GeO2 soots. The shape of the realized optical fiber 340 in the shelf region of the profile is characterized by a diffusion tail of GeO2 dopant, leading to a sloping, positive index rather than one that is flat and equal to that of un-doped silica (0% relative index). This results from diffusion of GeCl4 and GeCl2 from the core into the shelf region during dehydration with Cl2 at high temperature. A similar feature might be observed in outside vapor deposition (OVD), where burnoff may also occur in OVD.

Limitations of the available processing techniques and the effects of unavoidable physical processes, such as solid-state diffusion, have the result that the index profiles of actual fabricated optical fibers are always an approximation of the idealized index profile. However, the transmission properties of the actual fabricated optical fiber can be matched to those of the desired waveguide with idealized shape with careful engineering. The shape of the realized optical fiber 340 shows the measured index profile of an example fiber where the core and shelf regions were fabricated using the vapor-axial deposition method. The shape of the core and shelf regions of realized optical fiber 340 are such that the transitions between the core and the shelf regions are not immediately obvious on initial inspection, and the index profile of the core region does not conform to a shape easily described by a simple mathematical formula. However, the theory of equivalent optical waveguides summarized in R. Black, and C. Pask, "Equivalent Optical Waveguides," Journal of Lightwave Tech., Vol. 2, No. 3, June 1984, p 268-276, allows one to determine the equivalent idealized index profile that has transmission properties approximately equal to those of the fabricated optical fiber with irregular shape. Therefore, according to example embodiments, an equivalent idealized index profile shape can be determined for the core of the fabricated optical fiber such that the transmission properties of the idealized index profile and actual fabricated index profile are the same to close approximation. Furthermore, the delta of the shelf region can be assigned as the average of the delta between the core and the trench. Thus, according to an example embodiment, one can characterize the fabricated optical fiber using the mathematical formula and the parameter set of the equivalent idealized index profile shape and its transmission properties.

According to example embodiments, the FOM frontier distance metric gives a measure of the performance of a given fiber design relative to the best performing fiber design with the same microbend sensitivity. This metric is therefore useful in identifying the optimum fiber designs. However, complex calculations are often required to determine the FOM frontier distance for a given fiber. According to an example embodiment, we determine a simple algebraic function of index profile parameters that is used to estimate the FOM frontier distance for a given fiber design. The figure of merit frontier distance estimator is based on a regression model that fits a polynomial function of index profile parameters to the figure of merit frontier distance for all fiber designs (those shown in FIGS. 1 and 2, for example) that are within 1000% of the microbend frontier (as in curve 102 of FIG. 1). Fiber designs that are very far from the microbend frontier, i.e., MBF distance>100, are not used in the regression.

Figure 4:
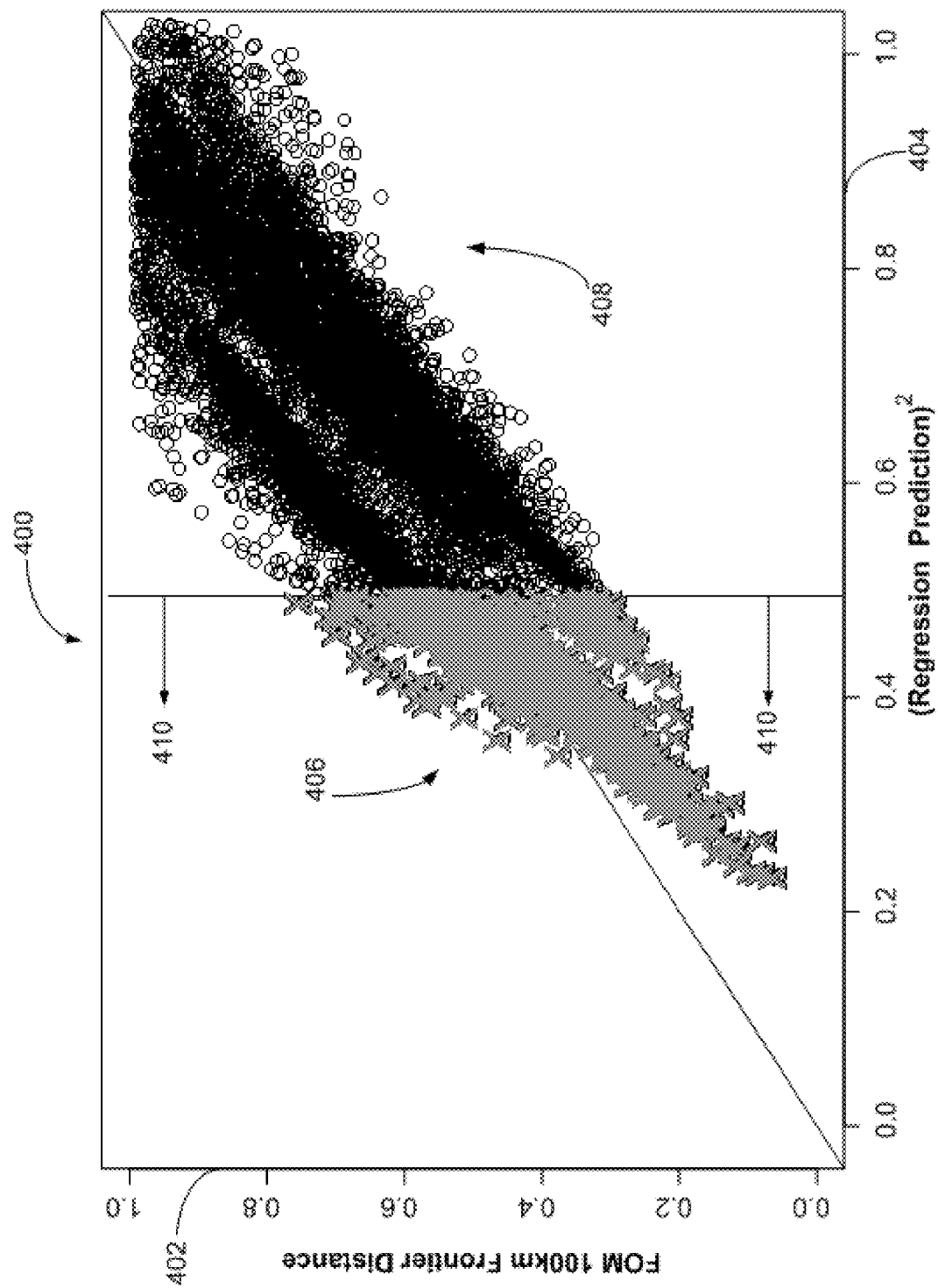
FIG. 4 depicts illustrative optical fiber designs selected within a 0.5 dB regression prediction of a figure of merit frontier distance and fitted within 1000% of the microbend frontier distance, according to example embodiments of the invention.

A multivariate, nonlinear least-square error minimization technique was used to perform the regression analysis and determine the estimator model. The FOM frontier distance estimator function explains 69% of the variation in the actual FOM frontier distance as indicated by the regression multiple R2 value of 0.687. The residual standard error of the fit is 0.062 indicating that the error of the estimator model in predicting the FOM frontier distance is low on average. This estimator model simplifies the process of identifying fiber designs that are close to the FOM frontier since only a simple algebraic calculation involving the index profile parameters is required to estimate the FOM frontier distance. FIG. 4 depicts illustrative optical fibers 400 plotted with the figure of merit frontier distance 402 versus an estimate of the figure of merit frontier distance 404. Although the points plotted as dark circles 408 fall close to the Y=X line as suggested by the low residual standard error and the large multiple R2 value, there is some uncertainty associated with the estimator's predictions. This uncertainty is illustrated by the points plotted with lighter shaded X's 406 in FIG. 4. The X's 406 are fiber designs with FOM frontier distance estimator <0.5 dB (as indicated by line 410). Although many of the X's 406 fall near or below the y=x line, indicating that the FOM frontier distance is equal to or less than the predictions of the estimator function, there are X's that fall above the y=x line. For these fiber designs, the estimator under predicts the FOM frontier distance; however, the worst case error is less than about 0.25 dB. According to an example embodiment, certain fibers 400 may be selected to be within a 0.5 dB regression prediction 410 of a figure of merit frontier distance (as in curve 202 of FIG. 2).

In the regression analysis, the shelf delta was held at 0%, since it is computationally difficult to perform a global optimization of both PMS and FOM simultaneously while varying all profile parameters. In one approximation, this would be the ideal value for minimizing loss since the Rayleigh scattering of the glass comprising the shelf is minimized. However, other desirable solutions will exist with delta between about −0.05% and +0.05%. Nonetheless the regression formulae obtained with delta=0% are reasonable approximations within the family of optical fiber profiles described herein.

Figure 5:
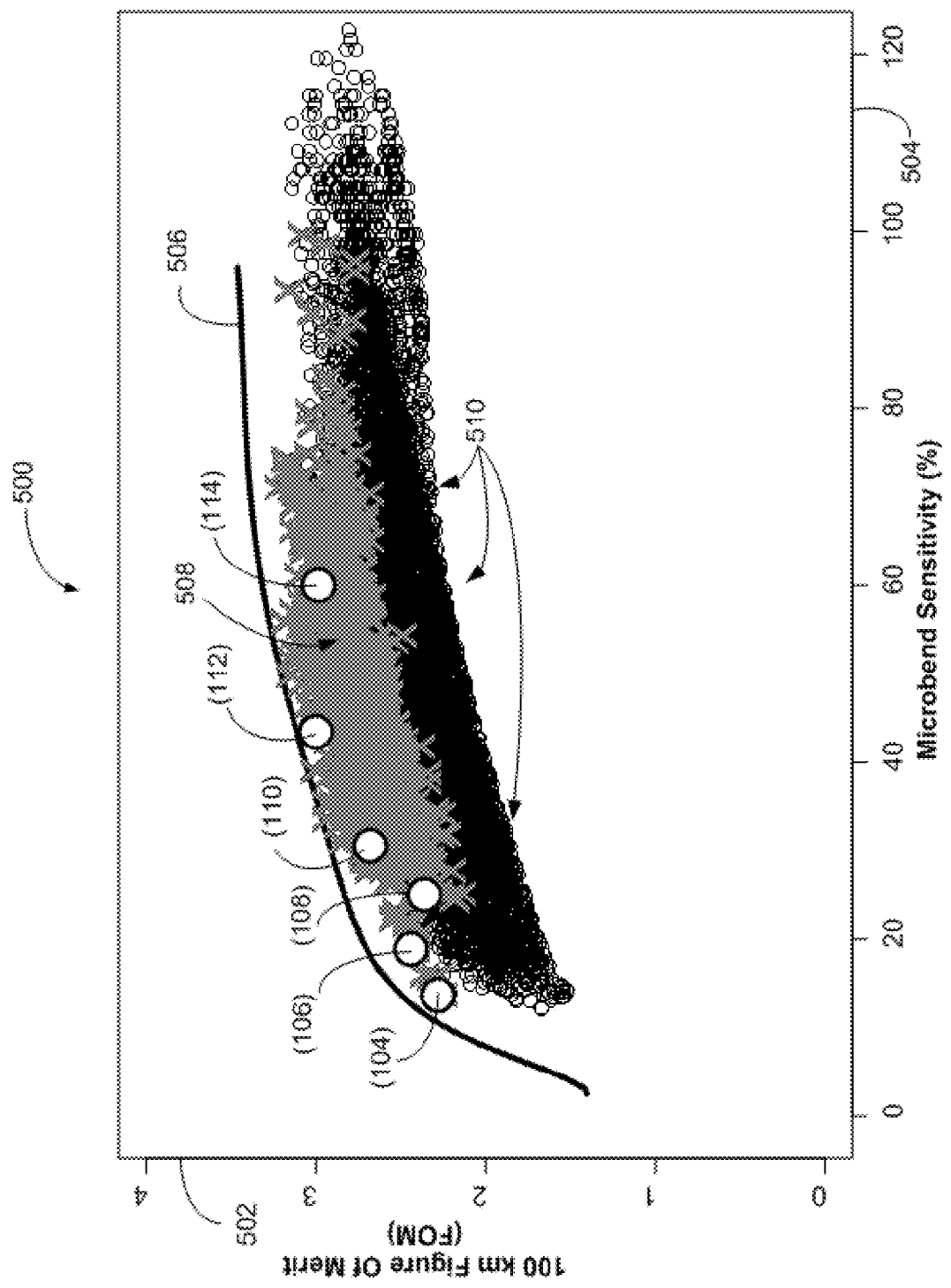
FIG. 5 depicts selected illustrative optical fiber designs plotted with frontier distance versus microbend sensitivity, according to example embodiments of the invention.

FIG. 5 depicts illustrative optical fibers 500 with the figure of merit 502 plotted versus microbend sensitivity 504, according to example embodiments. FIG. 5 shows selected fibers 508 and unselected fibers 510, and a figure of merit frontier curve 506 that is similar to that shown in FIG. 2. In accordance with example embodiments, the selected fibers 508 are within a 0.5 dB regression prediction of a figure of merit frontier distance and within 1000% of the microbend frontier distance. Example embodiments can include fibers within 90% of the microbend frontier distance. Example embodiments can include fibers within 50% of the microbend frontier distance. Example embodiments can include fibers within 25% of the microbend frontier distance. The parameters for the example fibers 104, 106, 108, 110, 112, 114, as shown in FIG. 1, are also plotted in FIG. 5, and will be additionally discussed with reference to FIGS. 11 and 12.

FIGS. 6, 7, 8, and 9 depict a multitude of optical fiber designs 600, 700, 800, 900 having fibers selected (lighter "x" symbols) to be within a 0.5 dB regression prediction of a figure of merit frontier distance and fitted within 1000% of the microbend frontier distance. The charts plot the fiber figure of merit frontier distance against other respective parameters, such as core radius (as in radius 310, FIG. 3), shelf width (as in width 314, FIG. 3), trench inner radius (as in radius 316, FIG. 3), and trench volume, which is defined as 100*(trench delta)*(trench width)*(2*trench inner radius+trench width). FIGS. 6, 7, 8, and 9 also indicate further selection brackets to narrow down the optical fiber designs that provide the desired characteristics, according to example embodiments.

Figure 6:
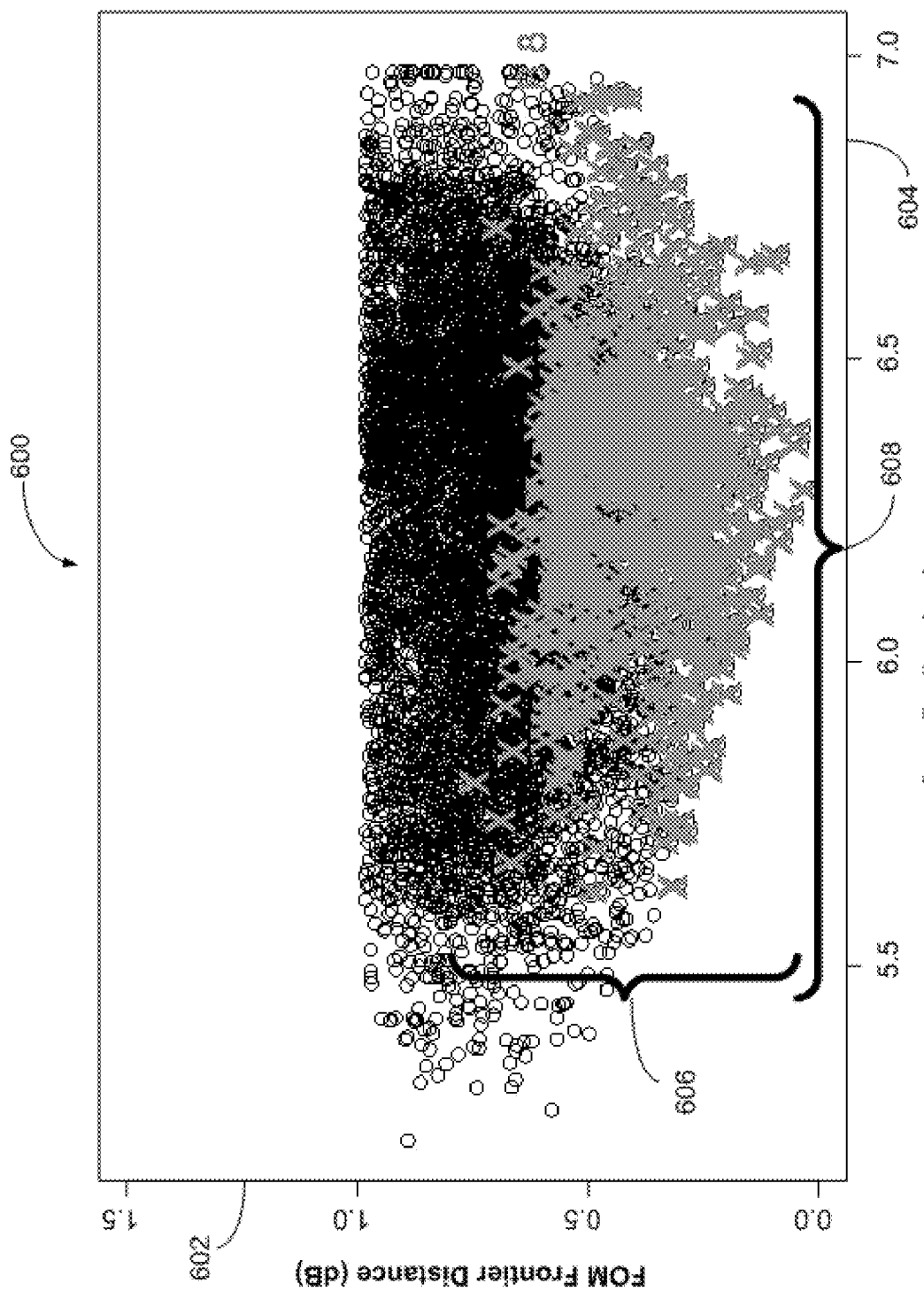
FIG. 6 depicts selected illustrative optical fiber designs plotted with frontier distance versus core radius, according to example embodiments of the invention.

For example, FIG. 6 shows a multitude of fiber designs 600 with fiber figure of merit frontier distance 602 plotted against the core radius 604. The fibers may be further selected to be within a certain figure of merit frontier distance range 606 and a certain core radius range 608. For example, according to example embodiments, optical fiber designs 600 can be selected, for example, as group 608, so that the core radius (as in radius 310 FIG. 3) is within a range of about 5.5 µm and about 7.0 µm. Example embodiments may include fiber designs having a core radius 310 less than about 6.8 µm. According to example embodiments, the fiber designs 600 may be further selected, for example, as in group 606, to have figure of merit (FOM) frontier distance less than about 0.8 dB. According to other example embodiments, the fiber designs 900 may be further selected, for example, as in group 906, to have figure of merit (FOM) frontier distance less than about 0.5 dB.

Figure 7:
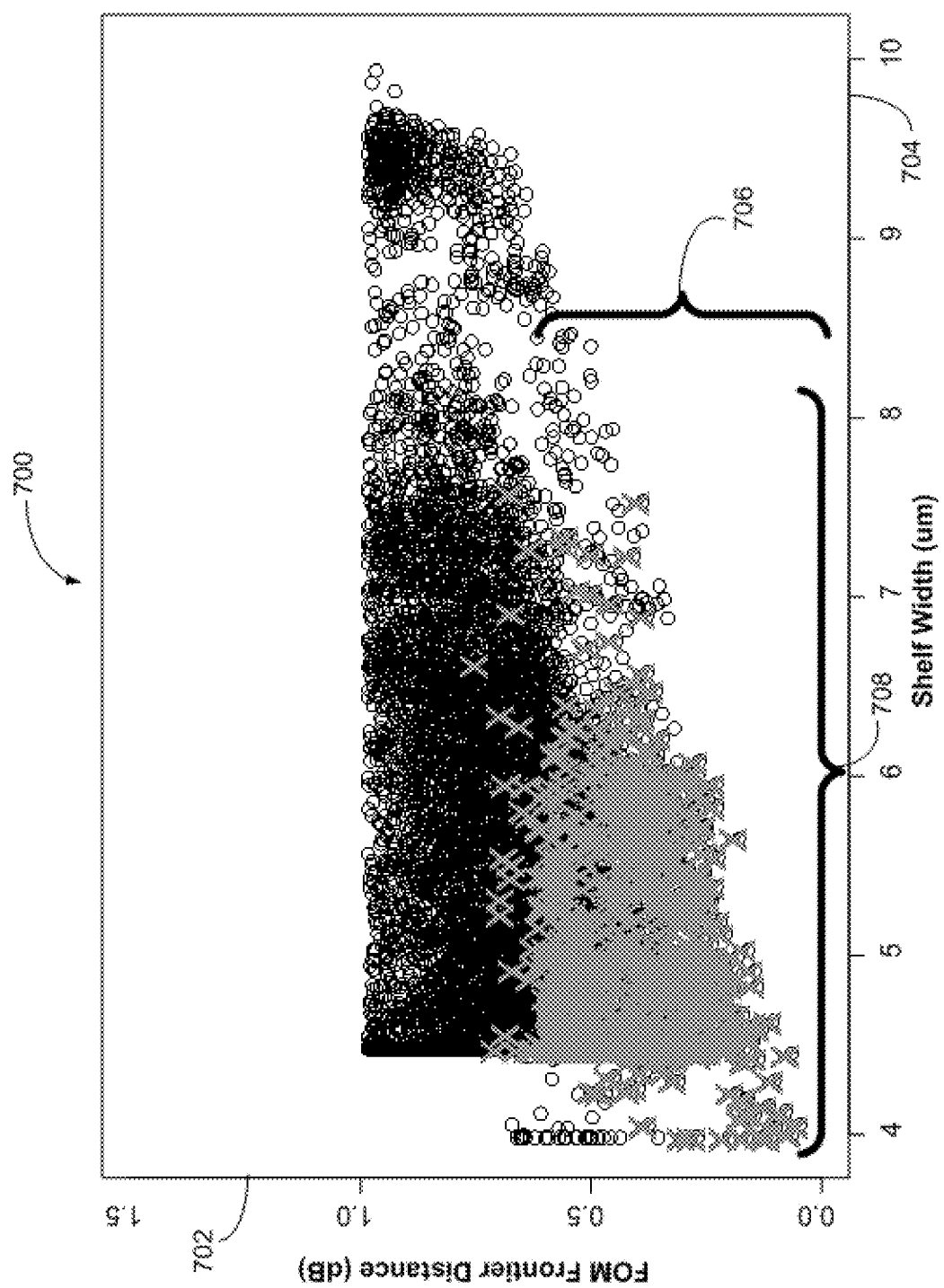
FIG. 7 depicts selected illustrative optical fiber designs plotted with frontier distance versus shelf width, according to example embodiments of the invention.

FIG. 7 shows a multitude of fiber designs 700 with fiber figure of merit frontier distance 702 plotted against the shelf width 704. The fibers may be further selected to be within a certain figure of merit frontier distance range 706 and a certain shelf width range 708. For example, according to example embodiments, optical fiber designs 700 can be selected, for example, as in group 708, so that the shelf width 314 is within a range of about 4 µm and about 8 µm. Example embodiments may include fiber designs having a shelf width 314 less than about 6 µm. According to example embodiments, the fiber designs 700 may be further selected, for example, as in group 706, to have figure of merit (FOM) frontier distance less than about 0.8 dB. According to other example embodiments, the fiber designs 900 may be further selected, for example, as in group 906, to have figure of merit (FOM) frontier distance less than about 0.5 dB.

Figure 8:
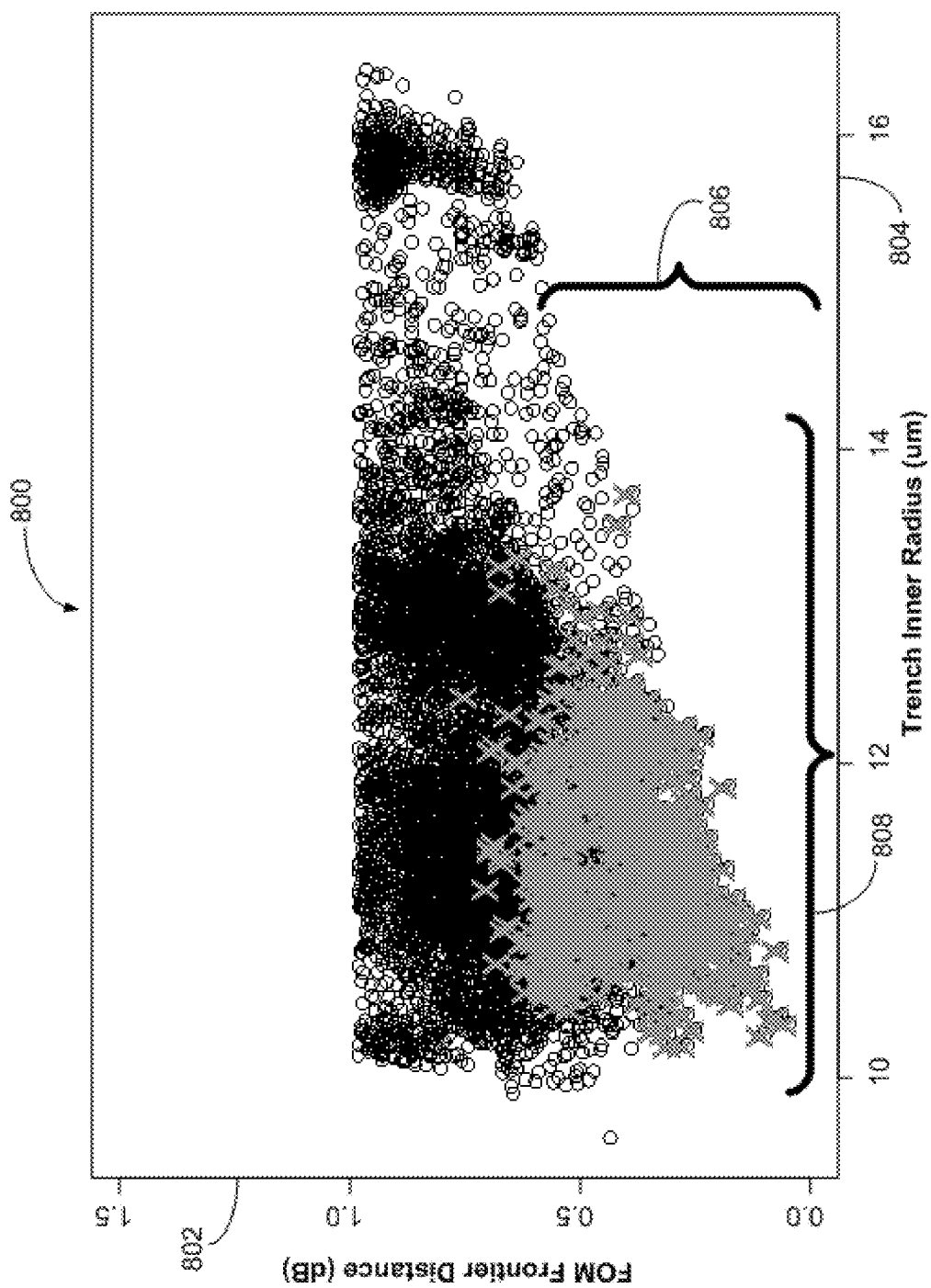
FIG. 8 depicts selected illustrative optical fiber designs plotted with frontier distance versus trench inner radius, according to example embodiments of the invention.

FIG. 8 shows a multitude of fiber designs 800 with fiber figure of merit frontier distance 802 plotted against the trench inner radius 804. The fibers may be further selected to be within a certain figure of merit frontier distance range 806 and a certain trench inner radius range 808. For example, according to example embodiments, optical fiber designs 800 can be selected, for example, as in group range 808, so that the trench inner radius 316 is with a range of about 10 µm and about 14 µm. Example embodiments may include fiber designs having a trench inner radius (316) less than about 13 µm. According to example embodiments, the fiber designs 800 may be further selected, for example, as in group 806, to have figure of merit (FOM) frontier distance less than about 0.8 dB. According to other example embodiments, the fiber designs 900 may be further selected, for example, as in group 906, to have figure of merit (FOM) frontier distance less than about 0.5 dB.

Figure 9:
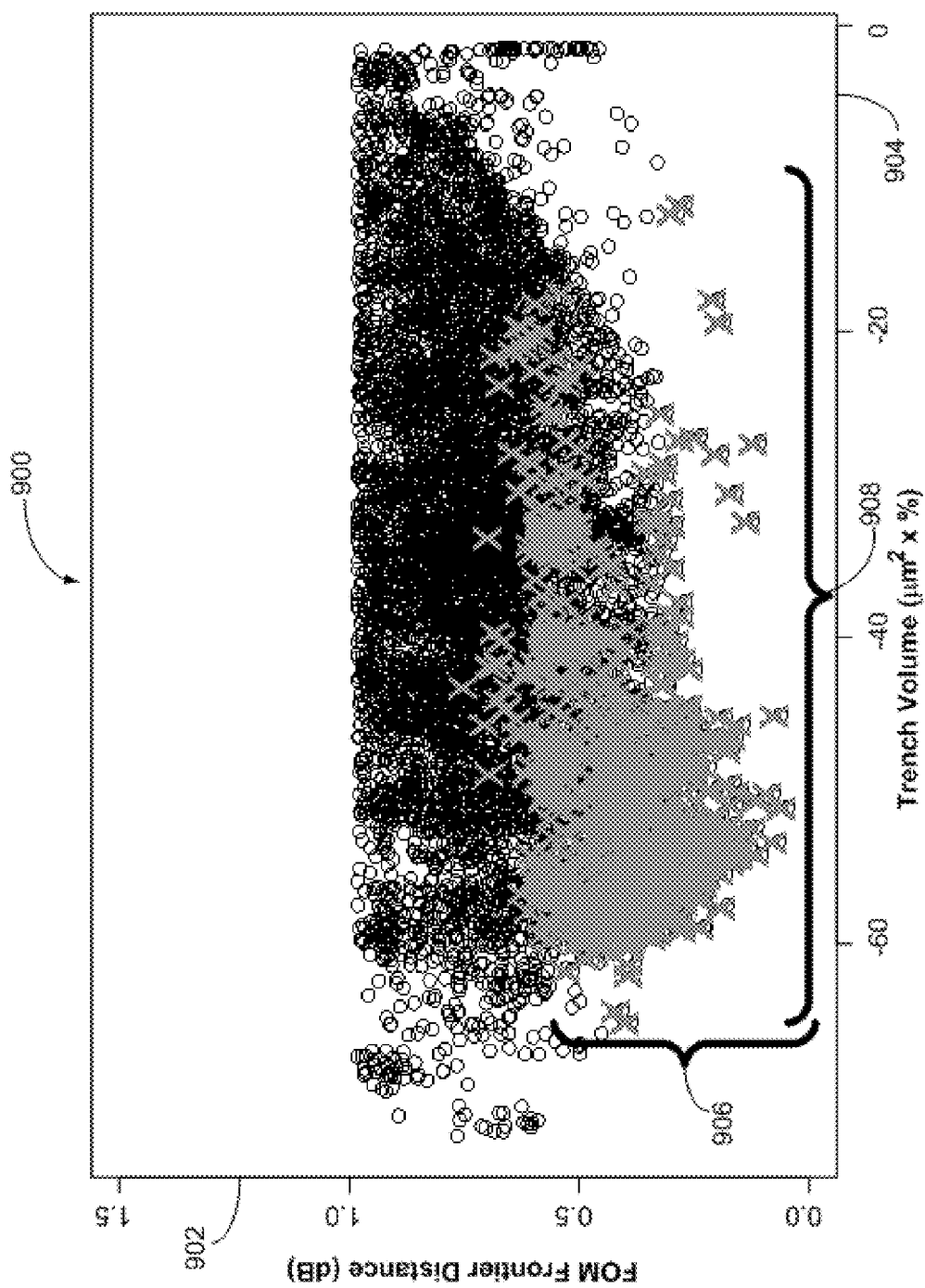
FIG. 9 depicts selected illustrative optical fiber designs plotted with frontier distance versus trench volume, according to example embodiments of the invention.

FIG. 9 shows a multitude of fiber designs 900 with fiber figure of merit frontier distance 902 plotted against the trench volume 904. The fibers may be further selected to be within a certain figure of merit frontier distance range 906 and a certain trench volume range 908. According to example embodiments, optical fiber designs 900 can be selected, for example, as in group 908, so that the trench volume is between about −70 µm²% and about −15 µm²%. Example embodiments may include fiber designs having a trench volume greater than −60 µm²%. According to example embodiments, the fiber designs 900 may be further selected, for example, as in group 906, to have figure of merit (FOM) frontier distance less than about 0.8 dB. According to other example embodiments, the fiber designs 900 may be further selected, for example, as in group 906, to have figure of merit (FOM) frontier distance less than about 0.5 dB.

Figure 10:
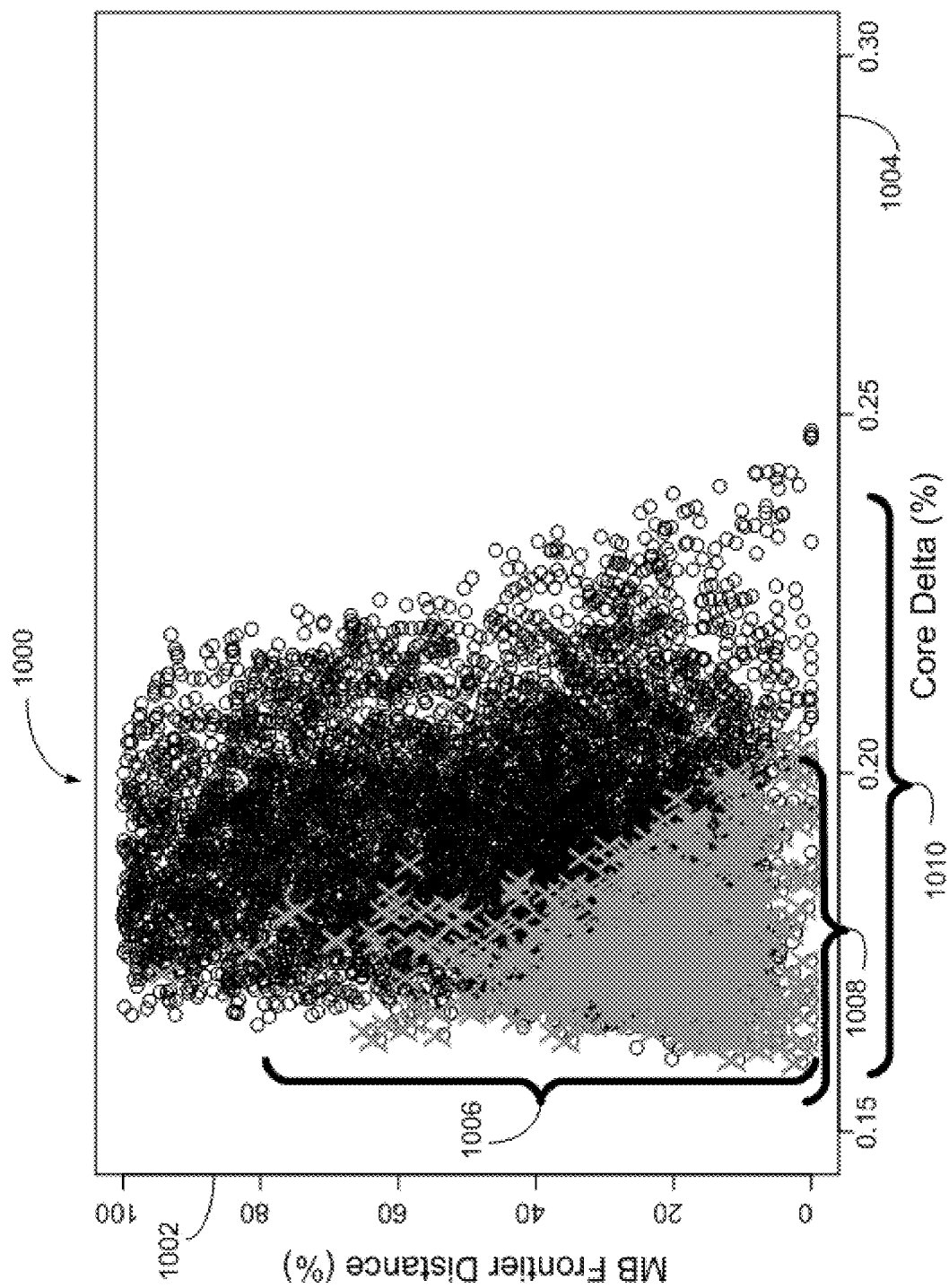
FIG. 10 depicts illustrative ultra large area optical fiber designs plotted with the microbend frontier (MBF) distance versus the core delta, according to example embodiments of the invention.

FIG. 10 depicts illustrative ultra large area optical fiber designs 1000 with core effective area (Aeff) between 130 µm² and about 155 µm²; a relative effective index difference (Neff) greater than or equal to about 0.0008, and a loss of less than 0.185 dB/km. The optical fiber designs 1000 are plotted with the microbend frontier (MBF) distance 1002 versus the core delta percent 1004. According to an example embodiment, the fiber designs 1000 may be selected to include designs having a microbend frontier (MBF) distance of less than about 80% 1006 and a core delta of less than about 0.20% 1008. In other example embodiments, the fiber designs 1000 may be selected to include designs having a microbend frontier (MBF) distance of less than about 80% 1006 and a core delta of less than about 0.24%. According to an example embodiment, the lighter shaded "X" symbols represent designs with a fitted microbend frontier distance less than about 1000% and a fitted figure of merit (FOM) frontier distance less than about 0.5 dB.

FIG. 11 shows a table 1100 of fiber profile designs according to example embodiments. The first five columns in the table shows the effective area (Aeff), Petermann microbend sensitivity (P. MB), distance from the microbend frontier (MB Dist.), figure of merit (FOM), and the distance from the FOM frontier (FOM Dist.), all calculated using full waveguide simulation. According to example embodiments, the profile design parameters, from which performance parameters were calculated, are shown in the remaining 9 columns. Starting from the bottom of the table of FIG. 11, rows 1-3 (labeled as 104, 106, and 108 respectively), and rows 5-8 (labeled as 110, 112, 114, and 1102 respectively) show example fiber designs characterized by idealized index profiles with alpha-profile core shapes. These fiber designs have effective areas in the range from 131 µm² to 165 µm². Furthermore, in accordance with the example embodiments, these fibers have very low Petermann microbend sensitivities, have microbend frontier distances less than 17%, have very high FOM, and have FOM frontier distances that are less than 0.5 dB.

Rows 4 and 9 (from the bottom, and labeled as 1101 and 1103 respectively) show measured and computed parameters for two example manufactured fibers that were fabricated with glass processing techniques typically used in large scale manufacturing of optical fiber. The values given in rows 4 and 9 are determined from measurements made on samples of the fabricated fibers. All of the embodiments shown in rows 1-3 and 5-8 assume that the delta of the shelf=0%, as previously explained.

Fibers were fabricated in accordance with example embodiments that span the range of Aeff from 135 µm² up to 165 µm², with an attenuation ranging from 0.176 to 0.180 DB/km. Row 4 in the table (and labeled as 1101), shows an example fiber, according to an example embodiment, with values of Aeff and attenuation of 142.4 um2 and 0.1762 dB/km, respectively. The refracted near field technique was used to measure the index profile which was then used to calculate the Petermann microbend sensitivity and FOM. As listed in the table, the Petermann microbend sensitivity and microbend frontier distance of this fiber are 41.1 and 26%, respectively. This fiber also has a FOM of 2.34 dB and FOM frontier distance of 0.53 dB.

Row 9 in the table (labeled as 1103) shows another example fiber, manufactured in accordance with example embodiments, with measured values of Aeff and attenuation of 165.9 µm² and 0.176 dB/km, respectively. The Petermann microbend sensitivity and microbend frontier distance of this fiber are 110.6 and 1.8%, respectively. The fiber has FOM of 3.0 dB and FOM frontier distance of 0.40 dB.

Figure 12:
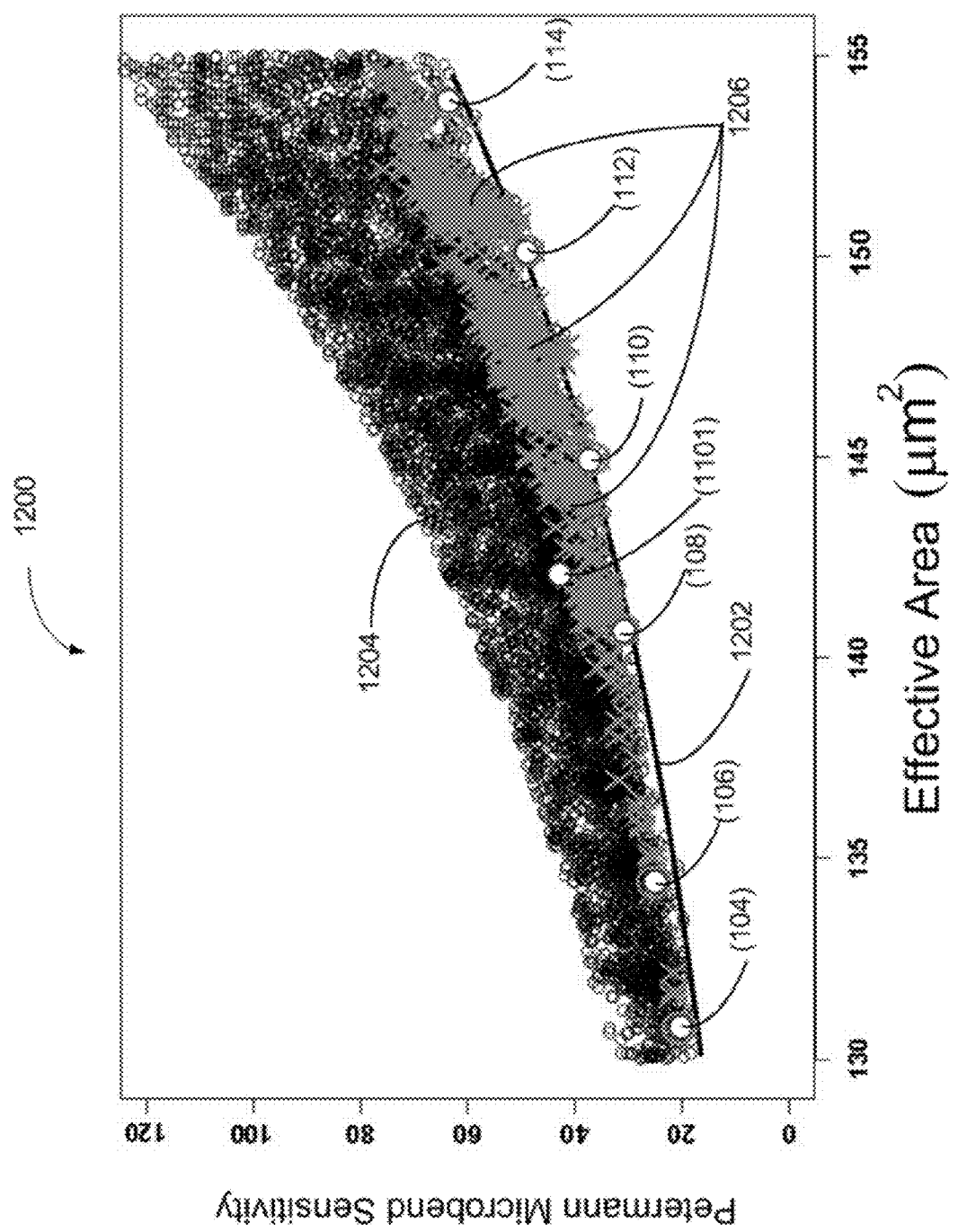
FIG. 12 is a chart of microbend sensitivity as a function of effective area for many example trench-assisted fiber designs.

FIG. 12 is a plot 1200 of Petermann microbend sensitivity versus effective area for fiber designs that are a subset of the fiber designs shown in FIG. 1. The dark circles 1204 show fibers selected from all the points in FIG. 1 so that the predicted loss is <0.185 dB/km, the effective index is >0.08%, and the FOM frontier distance is less than 0.5 dB. The light gray "X's" 1206 show a subset of the fibers represented by dark circles 1204 with the additional constraint that the microbend frontier distance is less than 25%. The open circles (104, 106, 108, 1101, 110, 112, 114) plotted in FIG. 12 show the fiber designs listed in rows 1-7 (from the bottom) in the table of FIG. 11.

Figure 13:
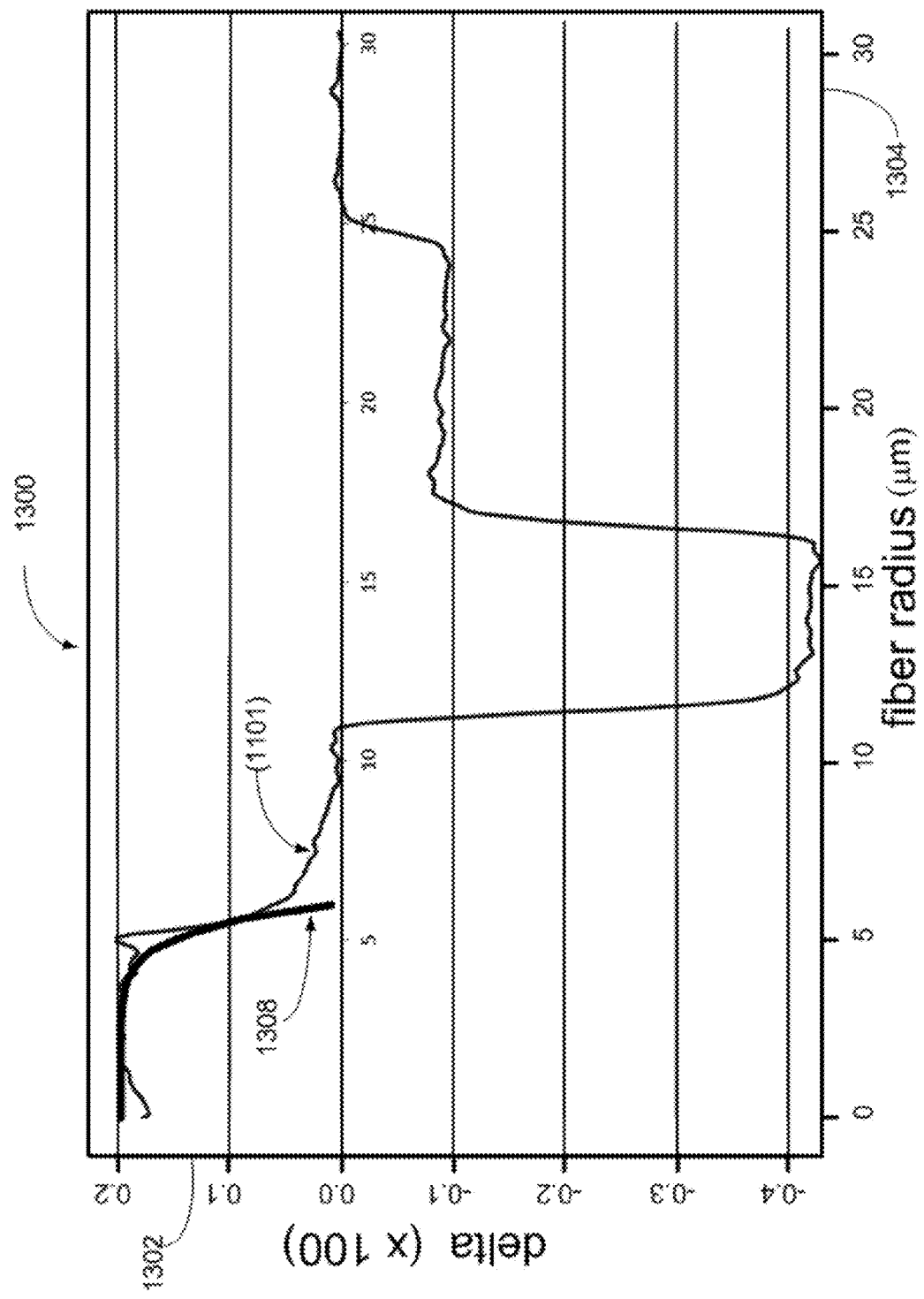
FIG. 13 depicts a measured optical fiber refractive index profile as a function of the fiber radius, according to an example embodiment of the invention.

FIG. 13 shows a plot 1300 of measured refractive index profile 1302 as a function of the fiber radius 1304 for an example optical fiber (1101). The corresponding parameters for this example fiber (1101) are those shown in row 4 (from the bottom) of FIG. 11. The example optical fiber (1101) effective area versus Petermann microbend sensitivity is also depicted in one of the open circles (1101) of FIG. 12. FIG. 13 also includes an example curve 1308 that depicts a core alpha of approximately 8, that may be utilized to model the core parameters of the example optical fiber (1101).

In example embodiments, a regression prediction for the microbend frontier distance can be modeled by evaluating all main index profile design effects, transformations, and interactions, and eliminating design effects or interactions that do not correlate with the microbend frontier distance. In an example embodiment, regression prediction for the microbend frontier distance can be modeled by:

$B1 \cdot \text{core delta} + B2 \cdot (\text{core radius})^{-1} + B3 \cdot \text{core volume} + B4 \cdot \text{trench delta} + B5 \cdot (\text{trench inner radius})^{-1} + B6 \cdot \text{trench inner radius} + B7 \cdot \text{trench volume} + B8 \cdot \text{trench volume} \cdot \text{trench inner radius}$, where, B1 is approximately 690; B2 is approximately −0.7; B3 is approximately −0.2; B4 is approximately 14; B5 is approximately 3; B6 is approximately 0.07; B7 is approximately 0.03; and B8 is approximately −0.0016.

In accordance with example embodiments, the fitted model for the microbend frontier distance has an R-squared value of 0.991 and a residual standard error of 6.6%. The large R-squared value implies that the model is accurate at explaining the trends. The residual standard error (6.6%) indicates that the 95% confidence interval for any single prediction of microbend frontier distance is +/−2.5 times this value, or approximately within 17%.

In example embodiments, a regression prediction for the figure of merit frontier distance can be modeled as:

$(A0 + A1 \cdot \text{core delta}^{0.5} + A2 \cdot \text{core alpha} + A3 \cdot \text{shelf width} + A4 \cdot \text{trench delta} + A5 \cdot \text{trench volume} + A6 \cdot \text{outer trench width} + A7 \cdot \text{outer trench delta} + A8 \cdot \text{trench delta} \cdot \text{trench width} + A9 \cdot \text{trench delta} \cdot \text{outer trench width} + A10 \cdot \text{trench delta} \cdot \text{outer trench delta})^2$, where A0 is approximately −0.9; A1 is approximately 35; A2 is approximately −0.0008; A3 is approximately 0.035; A4 is approximately 270; A5 is approximately −0.02; A6 is approximately 0.007; A7 is approximately −150; A8 is approximately 50; A9 is approximately −15; and A10 is approximately 8500.

In accordance with example embodiments, the fitted model for the FOM frontier distance has an R-squared value of 0.6866 and a residual standard error of 6.2%. The large R-squared value implies that the model is accurate at explaining the trends. The residual standard error (6.2%) indicates that the 95% confidence interval for any single prediction of FOM frontier distance is +/−2.5 times this value, or approximately within 16%.

According to an example embodiment, a trench-assisted optical fiber, optimized for microbending and figure-of-merit (FOM) performance is provided. The optical fiber includes a core region having a longitudinal axis, a shelf region surrounding said core region, a cladding region surrounding said shelf region, said core and shelf and cladding regions configured to support and guide the propagation of signal light in a fundamental transverse mode in said core and shelf regions in the direction of said axis, the cladding region including an inner trench and an outer trench. The optical fiber further includes a core radius between about 5.5 μm and about 7.0 μm; a core delta between about 0.13% and about 0.23%; a core volume between about 5 μm²% to about 9 μm²%; a shelf width between about 4 μm and about 8 μm; a trench inner radius between about 10 μm and about 14 μm; a trench width between about 1 μm and about 5 μm; a trench delta less than about −0.25%; a trench volume between about −70 μm²% and about −15 μm²%; a core effective area (Aeff) of between 135 μm² and about 170 μm²; a relative effective index difference (Neff) of greater than about 0.08%; a loss at 1550 nm of less than 0.185 dB/km; a figure of merit (FOM) frontier distance less than about 0.8 dB; and a microbend frontier (MBF) distance of less than about 90%.

In an example embodiment, the core radius is less than about 6.8 μm. In an example embodiment, the shelf width is less than about 6 μm. In an example embodiment, the trench inner radius is less than about 13 μm. In an example embodiment, the trench volume is greater than about −60 μm²%. In an example embodiment, the microbend sensitivity is less than about 120.

According to example embodiments, the optical fiber may further have a FOM frontier distance is defined as=$(A0 + A1 \cdot \text{core delta}^{0.5} + A3 \cdot \text{shelf width} + A4 \cdot \text{trench delta} + A5 \cdot \text{trench volume} + A6 \cdot \text{outer trench width} + A7 \cdot \text{outer trench delta} + A8 \cdot \text{trench delta} \cdot \text{trench width} + A9 \cdot \text{trench delta} \cdot \text{outer trench width} + A10 \cdot \text{trench delta} \cdot \text{outer trench delta})^2$, wherein: A0 is approximately −0.9; A1 is approximately 35; A3 is approximately 0.035; A4 is approximately 270; A5 is approximately −0.02; A6 is approximately 0.00; A7 is approximately −150; A8 is approximately 50; A9 is approximately −15; and A10 is approximately 8500. According to example embodiments, the microbend frontier (MBF) distance is less than about 25% and a figure of merit (FOM) frontier distance is less than about 0.5 dB, wherein the microbend frontier (MBF) distance is defined as: $B1 \cdot \text{core delta} + B2 \cdot (\text{core radius})^{-1} + B3 \cdot \text{core volume} + B4 \cdot \text{trench delta} + B5 \cdot (\text{trench inner radius})^{-1} + B6 \cdot \text{trench inner radius} + B7 \cdot \text{trench volume} + B8 \cdot \text{trench volume} \cdot \text{trench inner radius}$, and wherein B1 is approximately 690; B2 is approximately −0.7; B3 is approximately −0.2; B4 is approximately 14; B5 is approximately 3; B6 is approximately 0.07; B7 is approximately 0.03; and B8 is approximately −0.0016.

According to another example embodiment, a trench-assisted optical fiber, optimized for microbending and figure-of-merit (FOM) performance is provided. The optical fiber includes a core region having a longitudinal axis, a shelf region surrounding said core region, a cladding region surrounding said shelf region, said core and shelf and cladding regions configured to support and guide the propagation of signal light in a fundamental transverse mode in said core and shelf regions in the direction of said axis, the cladding region including an inner trench and an outer trench. The optical fiber further includes a core delta between about 0.13% and about 0.23%; a shelf width between about 4 μm and about 8 μm; a trench delta less than about −0.25%; a core effective area (Aeff) of between 135 μm² and about 170 μm²; a relative effective index difference (Neff) of greater than about 0.08%; a loss at 1550 nm of less than 0.185 dB/km; a microbend frontier (MBF) distance of less than about 90%; a figure of merit (FOM) frontier distance less than about 0.8 dB; an outer trench width between about 0 μm and about 25 μm; and an outer trench delta between about −0.33% and about 0%. According to an example embodiment, the shelf width (314) is less than about 6 μm.

In example embodiments, the optical fiber can further include a core radius between about 5.5 μm and about 7.0 μm; a core volume between about 5 μm²% to about 9 μm²%; a trench inner radius between about 10 μm and about 14 μm; a trench width between about 1 μm and about 5 μm; and a trench volume between about −70 μm²% and about −15 μm²%. According to an example embodiment, the trench inner radius is less than about 13 μm. According to an example embodiment, the trench volume is greater than about −60 μm²%. According to an example embodiment, the microbend sensitivity is less than about 120. According to an example embodiment, the FOM frontier distance is defined as=(A0+A1·core delta$^{0.5}$+A3·shelf width+A4·trench delta+A5·trench volume+A6·outer trench width+A7·outer trench delta+A8·trench delta·trench width+A9·trench delta·outer trench width+A10·trench delta·outer trench delta)², wherein: A0 is approximately −0.9; A1 is approximately 35; A3 is approximately 0.035; A4 is approximately 270; A5 is approximately −0.02; A6 is approximately 0.007; A7 is approximately −150; A8 is approximately 50; A9 is approximately −15; and A10 is approximately 8500.

According to example embodiments, the microbend frontier (MBF) distance is defined as: B1·core delta+B2·(core radius)$^{-1}$+B3·core volume+B4·trench delta+B5·(trench inner radius)$^{-1}$+B6·trench inner radius+B7·trench volume+B8·trench volume·trench inner radius, and wherein B1 is approximately 690; B2 is approximately −0.7; B3 is approximately −0.2; B4 is approximately 14; B5 is approximately 3; B6 is approximately 0.07; B7 is approximately 0.03; and B8 is approximately −0.0016.

In an example embodiment, the microbend frontier (MBF) distance is less than about 25% and the figure of merit (FOM) frontier distance is less than about 0.5 dB. According to an example embodiment, the loss at 1550 nm is less than 0.180 dB/km.

According to an example embodiment, a trench-assisted optical fiber, optimized for figure-of-merit (FOM) performance is provided. The optical fiber includes a core region having a longitudinal axis, a shelf region surrounding said core region, a cladding region surrounding said shelf region, said core and shelf and cladding regions configured to support and guide the propagation of signal light in a fundamental transverse mode in said core and shelf regions in the direction of said axis, the cladding region including an inner trench and an outer trench. The optical fiber further includes a core effective area (Aeff) of between 135 μm² and about 170 μm²; a relative effective index difference (Neff) of greater than about 0.08%; a loss at 1550 nm of less than 0.185 dB/km; and an index profile having a figure of merit (FOM) frontier distance less than about 0.5 dB. The FOM frontier distance is defined as=(A0+A1·core delta$^{0.5}$+A3·shelf width+A4·trench delta+A5·trench volume+A6·outer trench width+A7·outer trench delta+A8·trench delta·trench width+A9·trench delta·outer trench width+A10·trench delta outer trench delta)², wherein: A0 is approximately −0.9; A1 is approximately 35; A3 is approximately 0.035; A4 is approximately 270; A5 is approximately −0.02; A6 is approximately 0.007; A7 is approximately −150; A8 is approximately 50; A9 is approximately −15; and A10 is approximately 8500.

According to an example embodiment, the optical fiber can include one or more of: a core radius less than about 6.8 μm; a shelf width less than about 6 μm; an trench inner radius less than about 13 μm; a trench volume greater than about −60 μm²%; or a microbend sensitivity of less than about 120. According to an example embodiment, the optical fiber can include a core radius between about 5.5 μm and about 7.0 μm. In an example embodiment, the core delta is between about 0.13% and about 0.23%. In an example embodiment, the loss at 1550 nm is less than 0.180 dB/km. In an example embodiment, the core volume is between about 5 μm²% and about 9 μm²%. In an example embodiment, the shelf width is between about 4 μm and about 8 μm. In an example embodiment, the optical fiber can include a trench inner radius between about 10 μm and about 14 μm. In an example embodiment, the optical fiber can include a trench width between about 1 μm and about 5 μm. In an example embodiment, the trench delta is less than about −0.25%. In an example embodiment, the optical fiber can include a trench volume between about −701 μm²% and about −15 μm²%. According to an example embodiment, the outer trench delta is between about −0.33% and about 0%. According to an example embodiment, the outer trench width is between about 0 μm and about 25 μm.

According to another example embodiment, a trench-assisted optical fiber, optimized for microbending performance, is provided. The optical fiber includes a core region having a longitudinal axis, a shelf region surrounding said core region, a cladding region surrounding said shelf region, said core and shelf and cladding regions configured to support and guide the propagation of signal light in a fundamental transverse mode in said core and shelf regions in the direction of said axis, the cladding region including an inner trench and an outer trench. The optical fiber further includes a core effective area (Aeff) of between 135 μm² and about 170 μm²; a relative effective index difference (Neff) of greater than about 0.08%; a loss at 1550 nm of less than 0.185 dB/km; and a microbend frontier (MBF) distance of less than about 90%, wherein the microbend frontier (MBF) distance is defined as: B1·core delta+B2·(core radius)$^{-1}$+B3·core volume+B4·trench delta+B5·(trench inner radius)$^{-1}$+B6·trench inner radius+B7·trench volume+B8·trench volume·trench inner radius, and wherein B1 is approximately 690; B2 is approximately −0.7; B3 is approximately −0.2; B4 is approximately 14; B5 is approximately 3; B6 is approximately 0.07; B7 is approximately 0.03; and B8 is approximately −0.0016.

According to an example embodiment, the core delta is between about 0.13% and about 0.23%. According to an example embodiment, the core radius is between about 5.5 μm and about 7.0 μm. According to an example embodiment, the core volume is between about 5 μm²% to about 9 μm²%. According to an example embodiment, the trench delta is less than about −0.25%. According to an example embodiment, the trench inner radius is between about 10 μm and about 14 μm. According to an example embodiment, the trench volume is between about −70 μm²% and about −15 μm²%.

According to an example embodiment, the optical fiber can further include an outer trench surrounding the inner trench, and comprising: a shelf width between about 4 μm and about 8 μm; a trench width between about 1 μm and about 5 μm; a core effective area (Aeff) of between 135 μm² and about 1701 μm²; a relative effective index difference (Neff) of greater than about 0.08%; a figure of merit (FOM) frontier distance less than about 0.8 dB; an outer trench width between about 0 μm and about 25 μm; and an outer trench delta between about −0.33% and about 0%. According to an example embodiment, the optical fiber can further include one or more of: a core radius less than about 6.8 μm; a shelf width less than about 6 μm; an trench inner radius less than about 13 μm; a trench volume greater than about −60 μm²%; or a microbend sensitivity of less than about 120.

According to an example embodiment, the optical fiber can further include a microbend frontier (MBF) distance of less than about 25%, wherein the microbend frontier (MBF) distance is defined as: B1·core delta+B2·(core radius)$^{-1}$+B3·core volume+B4·trench delta+B5·(trench inner radius)$^{-1}$+B6·trench inner radius+B7·trench volume+B8·trench volume·trench inner radius, and wherein B1 is approximately 690; B2 is approximately −0.7; B3 is approximately −0.2; B4 is approximately 14; B5 is approximately 3; B6 is approximately 0.07; B7 is approximately 0.03; and B8 is approximately −0.0016.

According to an example embodiment, the optical fiber can further include an outer trench surrounding the inner trench, wherein the microbend frontier (MBF) distance is less than about 25%, and further comprising a figure of merit (FOM) frontier distance of less than about 0.5 dB, wherein the FOM frontier distance is defined as=(A0+A1·core delta$^{0.5}$+A3·shelf width+A4·trench delta+A5·trench volume+A6·outer trench width+A7·outer trench delta+A·8·trench delta·trench width+A9·trench delta·outer trench width+A10·trench delta outer trench delta)$^2$, and wherein: A0 is approximately −0.9; A1 is approximately 35; A3 is approximately 0.035; A4 is approximately 270; A5 is approximately −0.02; A6 is approximately 0.007; A7 is approximately −150; A8 is approximately 50; A9 is approximately −15; and A10 is approximately 8500. According to an example embodiment, the loss at 1550 nm is less than 0.180 dB/km.

According to an example embodiment, a trench-assisted optical fiber, optimized for figure-of-merit (FOM) performance, is provided. The optical fiber includes a core region having a longitudinal axis, a shelf region surrounding said core region, a cladding region surrounding said shelf region, said core and shelf and cladding regions configured to support and guide the propagation of signal light in a fundamental transverse mode in said core and shelf regions in the direction of said axis, the cladding region including an inner trench and an outer trench. The optical fiber further includes a core effective area (Aeff) of between 135 μm$^2$ and about 170 μm$^2$; a relative effective index difference (Neff) of greater than about 0.08%; a loss at 1550 nm of less than about 0.185 dB/km; a core radius less than about 6.8 μm; and an index profile having a figure of merit (FOM) frontier distance less than about 0.7 dB. The FOM frontier distance is defined as=(A0+A1·core delta$^{0.5}$+A3·shelf width+A4·trench delta+A5·trench volume+A6·outer trench width+A7·outer trench delta+A8·trench delta·trench width+A9·trench delta outer trench width+A10·trench delta·outer trench delta)$^2$. wherein: A0 is approximately −0.9; A1 is approximately 35; A3 is approximately 0.035; A4 is approximately 270; A5 is approximately −0.02; A6 is approximately 0.007; A7 is approximately −150; A8 is approximately 50; A9 is approximately −15; and A10 is approximately 8500. Example embodiments can include optical fiber having a FOM frontier distance less than 0.8 dB. Example embodiments can include optical fiber having a FOM frontier distance less than 0.7 dB. Example embodiments can include optical fiber having a FOM frontier distance less than 0.6 dB. Example embodiments can include optical fiber having a FOM frontier distance less than 0.5 dB. Example embodiments can include optical fiber having a FOM frontier distance less than 0.4 dB.

Example embodiments can include one or more of: a shelf width less than about 6 μm; an trench inner radius less than about 13 μm; a trench volume greater than about −60 μm$^2$%; or a microbend sensitivity of less than about 120. According to an example embodiment, the core delta is between about 0.13% and about 0.23%. According to an example embodiment, the loss at 1550 nm is less than 0.180 dB/km. According to example embodiments, the optical fiber can include a core volume between about 5 μm$^2$% and about 9 μm$^2$%. According to an example embodiment, the shelf width is between about 4 μm and about 8 μm. According to example embodiments, the optical fiber can include a trench inner radius between about 10 μm and about 14 μm. According to example embodiments, the optical fiber can include a trench width between about 1 μm and about 5 μm. In an example embodiment, the trench delta is less than about −0.25%. In an example embodiment, the trench volume is between about −70 μm$^2$% and about −15 μm$^2$%. In an example embodiment, the outer trench delta is between about −0.33% and about 0%. In an example embodiment, the outer trench width is between about 0 μm and about 25 μm.

According to another example embodiment, a trench-assisted optical fiber, optimized for microbending performance, is provided. The optical fiber includes a core region having a longitudinal axis, a shelf region surrounding said core region, a cladding region surrounding said shelf region, said core and shelf and cladding regions configured to support and guide the propagation of signal light in a fundamental transverse mode in said core and shelf regions in the direction of said axis, the cladding region including an inner trench and an outer trench. The optical fiber further includes a core effective area (Aeff) of between 135 μm$^2$ and about 170 μm$^2$; a relative effective index difference (Neff) of greater than about 0.08%; a loss at 1550 nm of less than 0.185 dB/km; a core delta less than 0.23%; and a microbend frontier (MBF) distance of less than about 80%, wherein the microbend frontier (MBF) distance is defined as: B1·core delta+B2·(core radius)$^{-1}$+B3·core volume+B4·trench delta+B5·(trench inner radius)+B6·trench inner radius+B7·trench volume+B8·trench volume·trench inner radius, and wherein B1 is approximately 690; B2 is approximately −0.7; B3 is approximately −0.2; B4 is approximately 14; B5 is approximately 3; B6 is approximately 0.07; B7 is approximately 0.03; and B8 is approximately −0.0016. In an example embodiment, the core delta is between about 0.13% and about 0.20%. In an example embodiment, the core radius is between about 5.5 μm and about 6.8 μm. In an example embodiment, the core volume is between about 5 μm$^2$% to about 9 μm$^2$%. In an example embodiment, the trench delta is less than about −0.25%. In an example embodiment, the trench inner radius is between about 10 μm and about 14 μm. In an example embodiment, the trench volume is between about −70 μm$^2$% and about −15 μm$^2$%.

According to example embodiments, the optical fiber can include an outer trench surrounding the inner trench, and comprising: a shelf width between about 4 μm and about 8 μm; a trench width between about 1 μm and about 5 μm; a core effective area (Aeff) of between 135 μm$^2$ and about 170 μm$^2$; a relative effective index difference (Neff) of greater than about 0.08%; a figure of merit (FOM) frontier distance less than about 0.8 dB; an outer trench width between about 0 μm and about 25 μm; and an outer trench delta between about −0.33% and about 0%; wherein the FOM frontier distance is defined as=(A0+A1·core delta$^{0.5}$+A3·shelf width+A4·trench delta+A5·trench volume+A6·outer trench width+A7·outer trench delta+A8·trench delta·trench width+A9·trench delta·outer trench width+A10·trench delta·outer trench delta)$^2$, wherein: A0 is approximately −0.9; A1 is approximately 35; A3 is approximately 0.035; A4 is approximately 270; A5 is approximately −0.02; A6 is approximately 0.007; A7 is approximately 150; A8 is approximately 50; A9 is approximately −15; and A10 is approximately 8500. In an example embodiment, the optical fiber loss at 1550 nm is less than 0.180 dB/km.

Accordingly, example embodiments can provide the technical effects of creating optical fibers that are optimized (or nearly optimized) for being insensitive to microbend-induced losses. Example embodiments can provide the further technical effects of providing optical fibers that have microbend sensitivity that is near the ideal limit for optical fibers having effective area between about 100 and about 160 $\mu m^2$. Example embodiments can provide the further technical effects of providing optical fibers that provide a predicted improvement in system optical signal to noise ratio (OSNR).

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A trench-assisted optical fiber, optimized for microbending performance, comprising a core region having a longitudinal axis, a shelf region surrounding said core region, a cladding region surrounding said shelf region, said core and shelf and cladding regions configured to support and guide the propagation of signal light in a fundamental transverse mode in said core and shelf regions in the direction of said axis, the cladding region including an inner trench and an outer trench, wherein the optical fiber further comprises:
   a core effective area (Aeff) of between 130 $\mu m^2$ and about 170 $\mu m^2$;
   an effective relative refractive index difference of greater than about 0.08%;
   a loss at 1550 nm of less than 0.180 dB/km; and
   a microbend frontier (MBF) distance of less than about 90%, wherein the microbend frontier (MBF) distance is defined as: B1·core delta+B2·(core radius)$^{-1}$+B3·core volume+B4·trench delta+B5·(trench inner radius)$^{-1}$ +B6·trench inner radius+B7·trench volume+B8·trench volume·trench inner radius, and wherein
   B1 is approximately 690;
   B2 is approximately −0.7 $\mu m$;
   B3 is approximately −0.27 $\mu m^{-2}$;
   B4 is approximately 14;
   B5 is approximately 3 $\mu m$;
   B6 is approximately 0.07 $\mu m^{-1}$;
   B7 is approximately 0.03 $\mu m^{-2}$; and
   B8 is approximately −0.0016 $\mu m^{-3}$.

2. The optical fiber of claim 1, wherein a core delta is between about 0.13% and about 0.23%.

3. The optical fiber of claim 1, wherein the core radius is between about 5.5 $\mu m$ and about 7.0 $\mu m$.

4. The optical fiber of claim 1, wherein the core volume is between about 5 $\mu m^2$% to about 9 $\mu m^2$%.

5. The optical fiber of claim 1, wherein a trench delta is less than about −0.25%.

6. The optical fiber of claim 1, wherein the trench inner radius is between about 10 $\mu m$ and about 14 $\mu m$.

7. The optical fiber of claim 1, wherein the trench volume is between about −70 $\mu m^2$% and about −15 $\mu m^2$%;

8. The optical fiber of claim 1 comprising:
   a shelf width between about 4 $\mu m$ and about 8 $\mu m$;
   a trench width between about 1 $\mu m$ and about 5 $\mu m$;
   a core effective area (Aeff) of between 135 $\mu m^2$ and about 170 $\mu m^2$;
   a relative effective index difference (Neff) of greater than about 0.08%; a figure of merit (FOM) frontier distance less than about 0.8 dB;
   an outer trench width between about 0 $\mu m$ and about 25 $\mu m$; and
   an outer trench delta between about −0.33% and about 0%.

9. The optical fiber of claim 1, further comprising one or more of:
   a core radius less than about 6.8 $\mu m$; a shelf width less than about 6 $\mu m$; an trench inner radius less than about 13 $\mu m$; a trench volume greater than about −60 $\mu m^2$%; or a microbend sensitivity of less than about 120.

10. The optical fiber of claim 1, further including an outer trench surrounding the inner trench, wherein the microbend frontier (MBF) distance is less than about 25%, and further comprising a figure of merit (FOM) frontier distance of less than about 0.5 dB, wherein the FOM frontier distance is defined as=(A0+A1·core delta$^{0.5}$+A3·shelf width+A4·trench delta+A5·trench volume+A6·outer trench width+A7·outer trench delta+A8·trench delta·trench width+A9·trench delta·outer trench width+A10·trench delta·outer trench delta)$^2$, and wherein:
   A0 is approximately −0.9;
   A1 is approximately 35;
   A3 is approximately 0.035 $\mu m^{-1}$;
   A4 is approximately 270;
   A5 is approximately −0.02 $\mu m^{-2}$;
   A6 is approximately 0.007 $\mu m^{-1}$;
   A7 is approximately −150;
   A8 is approximately 50 $\mu m^{-1}$;
   A9 is approximately −15 $\mu m^{-1}$; and
   A10 is approximately 8500.

11. The optical fiber of claim 1, wherein the cladding region includes an outermost cladding region surrounding the outer trench.

12. The optical fiber of claim 11, wherein the core region is doped with Ge and the outermost cladding region is undoped silica.

13. The optical fiber of claim 11, wherein the core region is doped with Ge and the outermost cladding region is silica doped with less than 3000 ppm of chlorine.

14. The optical fiber of claim 13, wherein the outermost cladding region is silica doped with between 1000 and 3000 ppm of chlorine.

15. The optical fiber of claim 11, wherein the loss at 1550 nm is less than 0.170 dB/km.

16. The optical fiber of claim 15, wherein the core region is pure silica core and the outermost cladding region is silica doped with less than 5 weight % of fluorine.

17. The optical fiber of claim 16, wherein the outermost cladding region is doped with between 1 and 3 weight % of fluorine.

18. The optical fiber of claim 16, wherein the pure silica core includes Cl-doping.

19. The optical fiber of claim 18, wherein the Cl-doping is less than 20000 ppm.

20. The optical fiber of claim 18, wherein the pure silica core includes F-doping and the F-doping is less than 10 weight %.

21. The optical fiber of claim 1, wherein an outer trench delta is between about −0.33% and about 0%.

* * * * *